(12) United States Patent
Arnone et al.

(10) Patent No.: US 8,986,117 B2
(45) Date of Patent: *Mar. 24, 2015

(54) SYSTEMS AND METHODS FOR REGULATED HYBRID GAMING

(71) Applicant: Gamblit Gaming, LLC, Glendale, CA (US)

(72) Inventors: Miles Arnone, Sherborn, MA (US); Frank Cire, Pasadena, CA (US); Eric Meyerhofer, Pasadena, CA (US); Caitlyn Ross, Watertown, MA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/474,023

(22) Filed: Aug. 29, 2014

(65) Prior Publication Data

US 2014/0370977 A1     Dec. 18, 2014

Related U.S. Application Data

(63) Continuation of application No. 14/181,190, filed on Feb. 14, 2014, now Pat. No. 8,821,270, which is a continuation of application No. 13/855,676, filed on Apr. 2, 2013, now Pat. No. 8,668,581, which is a (Continued)

(51) Int. Cl.
*A63F 13/00* (2014.01)
*G06F 19/00* (2011.01)
(Continued)

(52) U.S. Cl.
CPC .................................. *G07F 17/3241* (2013.01)
USPC ...................... 463/29; 463/9; 463/23; 463/25

(58) Field of Classification Search
USPC ............................................ 463/9, 23, 25, 29
See application file for complete search history.

(56) References Cited

U.S. PATENT DOCUMENTS

| 5,413,357 A | 5/1995 | Schulze et al. |
| 5,718,429 A | 2/1998 | Keller |

(Continued)

FOREIGN PATENT DOCUMENTS

| JP | 2001300098 A | 10/2001 |
| JP | 2003111980 A | 4/2003 |

(Continued)

OTHER PUBLICATIONS itl.nist.gov, Extreme Studentized Deviate Test, [online], Sep. 2010, Internet<URL:http://www.itl.nist.gov/div898/software/dataplot/refman1/auxillar/esd.htm>, entire document, National Institute of Standards and Technology (NIST), U.S. Department of Commerce.

(Continued)

*Primary Examiner* — William H McCulloch, Jr.
(74) *Attorney, Agent, or Firm* — Dwight Kim

(57) ABSTRACT

Systems and methods that regulate a hybrid game to detect and/or defeat unauthorized use of the hybrid game. One embodiment includes a method of detecting unauthorized operation of a hybrid gaming system that includes a gambling game and an entertainment game. In addition, the method can include collecting first game operating performance data (GOPD) from the entertainment game while the hybrid game is being played by a first player, generating a reference profile using the first GOPD, collecting second GOPD from the entertainment game while the hybrid game is being played by a second player, comparing the second GOPD to the reference profile to determine whether the second player is operating the hybrid game in an unauthorized manner, and generating a notification to an operator upon determination that the second player is operating the hybrid game in an unauthorized manner.

17 Claims, 5 Drawing Sheets

Related U.S. Application Data continuation-in-part of application No. PCT/US2012/040548, filed on Jun. 1, 2012.

(60) Provisional application No. 61/519,914, filed on Jun. 1, 2011.

(51) Int. Cl.
 *G06F 17/00* (2006.01)
 *G07F 17/32* (2006.01)

(56) References Cited

U.S. PATENT DOCUMENTS

| | | | |
|---|---|---|---|
| 5,785,592 A | 7/1998 | Jacobsen | |
| 5,853,324 A | 12/1998 | Kami et al. | |
| 5,963,745 A | 10/1999 | Collins et al. | |
| 6,050,895 A | 4/2000 | Luciano | |
| 6,165,071 A | 12/2000 | Weiss | |
| 6,227,974 B1 | 5/2001 | Eilat | |
| 6,267,669 B1 | 7/2001 | Luciano | |
| 6,685,563 B1 | 2/2004 | Meekins et al. | |
| 6,712,693 B1 | 3/2004 | Hettinger | |
| 6,761,632 B2 | 7/2004 | Bansemer et al. | |
| 6,761,633 B2 | 7/2004 | Riendeau | |
| 6,764,397 B1 | 7/2004 | Robb | |
| 6,811,482 B2 | 11/2004 | Letovsky | |
| 7,118,105 B2 | 10/2006 | Benevento | |
| 7,294,058 B1 | 11/2007 | Slomiany | |
| 7,326,115 B2 | 2/2008 | Baerlocher | |
| 7,361,091 B2 | 4/2008 | Letovsky | |
| 7,517,282 B1 | 4/2009 | Pryor | |
| 7,575,517 B2 | 8/2009 | Parham et al. | |
| 7,682,239 B2 | 3/2010 | Friedman et al. | |
| 7,720,733 B2 | 5/2010 | Jung | |
| 7,753,770 B2 | 7/2010 | Walker et al. | |
| 7,753,790 B2 | 7/2010 | Nguyen | |
| 7,766,742 B2 | 8/2010 | Bennett et al. | |
| 7,775,885 B2 | 8/2010 | Van Luchene | |
| 7,798,896 B2 | 9/2010 | Katz | |
| 7,828,657 B2 | 11/2010 | Booth | |
| 7,917,371 B2 | 3/2011 | Jung et al. | |
| 7,938,727 B1 | 5/2011 | Konkle | |
| 7,967,674 B2 | 6/2011 | Baerlocher | |
| 7,980,948 B2 | 7/2011 | Rowe | |
| 7,996,264 B2 | 8/2011 | Kusumoto et al. | |
| 8,012,023 B2 | 9/2011 | Gates | |
| 8,047,908 B2 | 11/2011 | Walker | |
| 8,047,915 B2 | 11/2011 | Lyle | |
| 8,060,829 B2 | 11/2011 | Jung et al. | |
| 8,075,383 B2 | 12/2011 | Friedman et al. | |
| 8,087,999 B2 | 1/2012 | Oberberger | |
| 8,113,938 B2 | 2/2012 | Friedman et al. | |
| 8,118,654 B1 | 2/2012 | Nicolas | |
| 8,128,487 B2 | 3/2012 | Hamilton et al. | |
| 8,135,648 B2 | 3/2012 | Oram | |
| 8,137,193 B1 | 3/2012 | Kelly et al. | |
| 8,142,272 B2 | 3/2012 | Walker | |
| 8,157,653 B2 | 4/2012 | Buhr | |
| 8,167,699 B2 | 5/2012 | Inamura | |
| 8,177,628 B2 | 5/2012 | Manning | |
| 8,182,338 B2 | 5/2012 | Thomas | |
| 8,182,339 B2 | 5/2012 | Anderson | |
| 8,187,068 B2 | 5/2012 | Slomiany | |
| 8,206,210 B2 | 6/2012 | Walker | |
| 8,308,544 B2 | 11/2012 | Friedman | |
| 8,360,838 B2 | 1/2013 | Nguyen | |
| 8,360,854 B2 | 1/2013 | Popovich | |
| 8,435,111 B2 | 5/2013 | Filipour | |
| 8,475,266 B2 | 7/2013 | Arnone | |
| 8,480,470 B2 | 7/2013 | Napolitano et al. | |
| 8,561,178 B2 | 10/2013 | Schluessler | |
| 8,562,445 B2 | 10/2013 | Arnone | |
| 8,622,809 B1 | 1/2014 | Arora et al. | |
| 8,628,408 B2 | 1/2014 | Popovich | |
| 8,668,581 B2 | 3/2014 | Arnone | |
| 8,753,193 B2 * | 6/2014 | Popovich et al. | 463/25 |
| 8,753,212 B2 * | 6/2014 | Arnone et al. | 463/42 |
| 8,858,321 B2 * | 10/2014 | Popovich et al. | 463/25 |
| 2001/0004609 A1 | 6/2001 | Walker et al. | |
| 2001/0019965 A1 | 9/2001 | Ochi | |
| 2002/0022509 A1 | 2/2002 | Nicastro | |
| 2002/0090990 A1 | 7/2002 | Joshi et al. | |
| 2002/0175471 A1 | 11/2002 | Faith | |
| 2003/0060286 A1 | 3/2003 | Walker et al. | |
| 2003/0119576 A1 | 6/2003 | McClintic et al. | |
| 2003/0139214 A1 | 7/2003 | Wolf et al. | |
| 2003/0171149 A1 | 9/2003 | Rothschild | |
| 2003/0204565 A1 | 10/2003 | Guo et al. | |
| 2003/0211879 A1 | 11/2003 | Englman | |
| 2004/0092313 A1 | 5/2004 | Saito et al. | |
| 2004/0102238 A1 | 5/2004 | Taylor | |
| 2004/0121839 A1 | 6/2004 | Webb | |
| 2004/0225387 A1 | 11/2004 | Smith | |
| 2005/0003878 A1 | 1/2005 | Updike | |
| 2005/0096124 A1 | 5/2005 | Stronach | |
| 2005/0116411 A1 | 6/2005 | Herrmann et al. | |
| 2005/0192087 A1 | 9/2005 | Friedman et al. | |
| 2005/0233791 A1 | 10/2005 | Kane | |
| 2005/0233806 A1 | 10/2005 | Kane et al. | |
| 2005/0239538 A1 | 10/2005 | Dixon | |
| 2005/0250574 A1 | 11/2005 | Kane | |
| 2005/0269778 A1 | 12/2005 | Samberg | |
| 2005/0288101 A1 | 12/2005 | Lockton et al. | |
| 2006/0003823 A1 | 1/2006 | Zhang | |
| 2006/0003830 A1 | 1/2006 | Walker et al. | |
| 2006/0035696 A1 | 2/2006 | Walker | |
| 2006/0040735 A1 | 2/2006 | Baerlocher | |
| 2006/0068913 A1 | 3/2006 | Walker et al. | |
| 2006/0084499 A1 | 4/2006 | Moshal | |
| 2006/0084505 A1 | 4/2006 | Yoseloff | |
| 2006/0116198 A1 | 6/2006 | Leen | |
| 2006/0116199 A1 | 6/2006 | Leen | |
| 2006/0116200 A1 | 6/2006 | Leen | |
| 2006/0135250 A1 | 6/2006 | Rossides | |
| 2006/0154710 A1 | 7/2006 | Serafat | |
| 2006/0166729 A1 | 7/2006 | Saffari et al. | |
| 2006/0189371 A1 | 8/2006 | Walker et al. | |
| 2006/0223611 A1 | 10/2006 | Baerlocher | |
| 2006/0234791 A1 | 10/2006 | Nguyen et al. | |
| 2006/0240890 A1 | 10/2006 | Walker | |
| 2006/0246403 A1 | 11/2006 | Monpouet et al. | |
| 2006/0258433 A1 | 11/2006 | Finocchio et al. | |
| 2007/0026924 A1 | 2/2007 | Taylor | |
| 2007/0035548 A1 | 2/2007 | Jung et al. | |
| 2007/0038559 A1 | 2/2007 | Jung et al. | |
| 2007/0064074 A1 | 3/2007 | Silverbrook et al. | |
| 2007/0087799 A1 | 4/2007 | Van Luchene | |
| 2007/0093299 A1 | 4/2007 | Bergeron | |
| 2007/0099696 A1 | 5/2007 | Nguyen et al. | |
| 2007/0117641 A1 | 5/2007 | Walker et al. | |
| 2007/0129149 A1 | 6/2007 | Walker | |
| 2007/0156509 A1 | 7/2007 | Jung et al. | |
| 2007/0167212 A1 | 7/2007 | Nguyen | |
| 2007/0167239 A1 | 7/2007 | O'Rourke | |
| 2007/0173311 A1 | 7/2007 | Morrow et al. | |
| 2007/0191104 A1 | 8/2007 | Van Luchene | |
| 2007/0203828 A1 | 8/2007 | Jung et al. | |
| 2007/0207847 A1 | 9/2007 | Thomas | |
| 2007/0259717 A1 | 11/2007 | Mattice | |
| 2007/0293306 A1 | 12/2007 | Nee et al. | |
| 2008/0004107 A1 | 1/2008 | Nguyen et al. | |
| 2008/0014835 A1 | 1/2008 | Weston et al. | |
| 2008/0015004 A1 | 1/2008 | Gatto et al. | |
| 2008/0064488 A1 | 3/2008 | Oh | |
| 2008/0070659 A1 | 3/2008 | Naicker | |
| 2008/0070690 A1 | 3/2008 | Van Luchene | |
| 2008/0070702 A1 | 3/2008 | Kaminkow | |
| 2008/0096665 A1 | 4/2008 | Cohen | |
| 2008/0108406 A1 | 5/2008 | Oberberger | |
| 2008/0108425 A1 | 5/2008 | Oberberger | |
| 2008/0113704 A1 | 5/2008 | Jackson | |
| 2008/0119283 A1 | 5/2008 | Baerlocher | |
| 2008/0146308 A1 | 6/2008 | Okada | |
| 2008/0161081 A1 | 7/2008 | Berman | |

(56) References Cited

U.S. PATENT DOCUMENTS

| | | |
|---|---|---|
| 2008/0176619 A1 | 7/2008 | Kelly |
| 2008/0191418 A1 | 8/2008 | Lutnick et al. |
| 2008/0195481 A1 | 8/2008 | Lutnick |
| 2008/0234037 A1 | 9/2008 | Leen |
| 2008/0248850 A1 | 10/2008 | Schugar |
| 2008/0254893 A1 | 10/2008 | Patel |
| 2008/0274796 A1 | 11/2008 | Lube |
| 2008/0274798 A1 | 11/2008 | Walker et al. |
| 2008/0311980 A1 | 12/2008 | Cannon |
| 2008/0318668 A1 | 12/2008 | Ching |
| 2009/0011827 A1 | 1/2009 | Englman |
| 2009/0023489 A1 | 1/2009 | Toneguzzo |
| 2009/0023492 A1 | 1/2009 | Erfanian |
| 2009/0048010 A1 | 2/2009 | Kroeckel |
| 2009/0061974 A1 | 3/2009 | Lutnick et al. |
| 2009/0061975 A1 | 3/2009 | Ditchev |
| 2009/0061991 A1 | 3/2009 | Popovich |
| 2009/0061997 A1 | 3/2009 | Popovich |
| 2009/0061998 A1 | 3/2009 | Popovich |
| 2009/0061999 A1 | 3/2009 | Popovich |
| 2009/0069088 A1 | 3/2009 | Levitt |
| 2009/0082093 A1 | 3/2009 | Okada |
| 2009/0088239 A1 | 4/2009 | Iddings |
| 2009/0098934 A1 | 4/2009 | Amour |
| 2009/0118006 A1 | 5/2009 | Kelly et al. |
| 2009/0124344 A1 | 5/2009 | Mitchell et al. |
| 2009/0131158 A1 | 5/2009 | Brunet De Courssou et al. |
| 2009/0131175 A1 | 5/2009 | Kelly et al. |
| 2009/0143141 A1 | 6/2009 | Wells |
| 2009/0149233 A1 | 6/2009 | Strause et al. |
| 2009/0156297 A1 | 6/2009 | Andersson et al. |
| 2009/0176560 A1 | 7/2009 | Herrmann et al. |
| 2009/0176566 A1 | 7/2009 | Kelly |
| 2009/0181777 A1 | 7/2009 | Christiani |
| 2009/0221355 A1 | 9/2009 | Dunaevsky et al. |
| 2009/0239610 A1 | 9/2009 | Olive |
| 2009/0247272 A1 | 10/2009 | Abe |
| 2009/0270164 A1 | 10/2009 | Seelig |
| 2009/0291755 A1 | 11/2009 | Walker et al. |
| 2009/0309305 A1 | 12/2009 | May |
| 2009/0312093 A1 | 12/2009 | Walker et al. |
| 2009/0325686 A1 | 12/2009 | Davis |
| 2010/0004058 A1 | 1/2010 | Acres |
| 2010/0016056 A1 | 1/2010 | Thomas et al. |
| 2010/0029373 A1 | 2/2010 | Graham et al. |
| 2010/0035674 A1 | 2/2010 | Slomiany |
| 2010/0056247 A1 | 3/2010 | Nicely |
| 2010/0056260 A1 | 3/2010 | Fujimoto |
| 2010/0062836 A1 | 3/2010 | Young |
| 2010/0093420 A1 | 4/2010 | Wright |
| 2010/0093444 A1 | 4/2010 | Biggar et al. |
| 2010/0105454 A1 | 4/2010 | Weber |
| 2010/0120525 A1 | 5/2010 | Baerlocher et al. |
| 2010/0124983 A1 | 5/2010 | Gowin et al. |
| 2010/0137047 A1 | 6/2010 | Englman et al. |
| 2010/0174593 A1 | 7/2010 | Cao |
| 2010/0184509 A1 | 7/2010 | Sylla et al. |
| 2010/0203940 A1 | 8/2010 | Alderucci et al. |
| 2010/0210344 A1 | 8/2010 | Edidin et al. |
| 2010/0227672 A1 | 9/2010 | Amour |
| 2010/0227688 A1 | 9/2010 | Lee |
| 2010/0240436 A1 | 9/2010 | Wilson et al. |
| 2010/0304825 A1 | 12/2010 | Davis |
| 2010/0304839 A1 | 12/2010 | Johnson |
| 2010/0304842 A1 | 12/2010 | Friedman et al. |
| 2011/0009177 A1 | 1/2011 | Katz |
| 2011/0009178 A1 | 1/2011 | Gerson |
| 2011/0045896 A1 | 2/2011 | Sak et al. |
| 2011/0077087 A1 | 3/2011 | Walker et al. |
| 2011/0082571 A1 | 4/2011 | Murdock et al. |
| 2011/0105206 A1 | 5/2011 | Rowe et al. |
| 2011/0107239 A1 | 5/2011 | Adoni |
| 2011/0109454 A1 | 5/2011 | McSheffrey |
| 2011/0111820 A1 | 5/2011 | Filipour |
| 2011/0111837 A1 | 5/2011 | Gagner |
| 2011/0111841 A1 | 5/2011 | Tessmer |
| 2011/0118011 A1 | 5/2011 | Filipour et al. |
| 2011/0124392 A1 | 5/2011 | Kroeckel |
| 2011/0201413 A1 | 8/2011 | Oberberger |
| 2011/0207523 A1 | 8/2011 | Filipour et al. |
| 2011/0212766 A1 | 9/2011 | Bowers |
| 2011/0212767 A1 | 9/2011 | Barclay |
| 2011/0218028 A1 | 9/2011 | Acres |
| 2011/0218035 A1 | 9/2011 | Thomas |
| 2011/0230258 A1 | 9/2011 | Van Luchene |
| 2011/0230260 A1 | 9/2011 | Morrow et al. |
| 2011/0230267 A1 | 9/2011 | Van Luchene |
| 2011/0244944 A1 | 10/2011 | Baerlocher |
| 2011/0263312 A1 | 10/2011 | De Waal |
| 2011/0269522 A1 | 11/2011 | Nicely et al. |
| 2011/0275440 A1 | 11/2011 | Faktor |
| 2011/0287828 A1 | 11/2011 | Anderson et al. |
| 2011/0287841 A1 | 11/2011 | Watanabe |
| 2011/0312408 A1 | 12/2011 | Okuaki |
| 2011/0319169 A1 | 12/2011 | Lam |
| 2012/0004747 A1 | 1/2012 | Kelly |
| 2012/0015708 A1 | 1/2012 | Kroeckel |
| 2012/0028718 A1 | 2/2012 | Barclay et al. |
| 2012/0058814 A1 | 3/2012 | Lutnick |
| 2012/0077569 A1 | 3/2012 | Watkins |
| 2012/0108323 A1 | 5/2012 | Kelly |
| 2012/0135793 A1 | 5/2012 | Antonopoulos |
| 2012/0135798 A1 | 5/2012 | Leen |
| 2012/0202587 A1 | 8/2012 | Allen |
| 2012/0208623 A1 | 8/2012 | Friedman |
| 2012/0302311 A1 | 11/2012 | Luciano |
| 2012/0322545 A1 | 12/2012 | Arnone et al. |
| 2013/0017890 A1 | 1/2013 | Leen |
| 2013/0029760 A1 | 1/2013 | Wickett |
| 2013/0072306 A1* | 3/2013 | Parnprome ............. 463/42 |
| 2013/0079076 A1 | 3/2013 | Filipour |
| 2013/0123011 A1 | 5/2013 | Nguyen |
| 2013/0131848 A1 | 5/2013 | Arnone et al. |
| 2013/0165196 A1 | 6/2013 | Kroeckel |
| 2013/0178273 A1 | 7/2013 | De Waal |
| 2013/0190074 A1 | 7/2013 | Arnone et al. |
| 2013/0217471 A1 | 8/2013 | Arnone |
| 2013/0217485 A1 | 8/2013 | Arnone |
| 2013/0237326 A1 | 9/2013 | Arnone |
| 2013/0244764 A1 | 9/2013 | Arnone |
| 2013/0244765 A1 | 9/2013 | Arnone |
| 2013/0252687 A1 | 9/2013 | Arnone |
| 2013/0260869 A1 | 10/2013 | Basallo et al. |
| 2013/0273986 A1 | 10/2013 | Arnone |
| 2014/0087801 A1 | 3/2014 | Nicely et al. |
| 2014/0087808 A1 | 3/2014 | Basallo et al. |
| 2014/0087809 A1 | 3/2014 | Leupp et al. |
| 2014/0121004 A1* | 5/2014 | Arnone et al. ............. 463/25 |
| 2014/0128152 A1* | 5/2014 | Arnone et al. ............. 463/25 |
| 2014/0141863 A1* | 5/2014 | Arnone et al. ............. 463/23 |
| 2014/0155147 A1* | 6/2014 | Arnone et al. ............. 463/25 |
| 2014/0155151 A1* | 6/2014 | Arnone et al. ............. 463/29 |
| 2014/0171186 A1* | 6/2014 | Arnone et al. ............. 463/25 |
| 2014/0200074 A1* | 7/2014 | Arnone et al. ............. 463/25 |
| 2014/0243059 A1* | 8/2014 | Arnone et al. ............. 463/2 |
| 2014/0274345 A1* | 9/2014 | Arnone et al. ............. 463/25 |
| 2014/0295967 A1* | 10/2014 | Arnone et al. ............. 463/31 |
| 2014/0302916 A1* | 10/2014 | Arnone et al. ............. 463/25 |
| 2014/0323211 A1* | 10/2014 | Arnone et al. ............. 463/25 |

FOREIGN PATENT DOCUMENTS

| | | |
|---|---|---|
| JP | 2004097610 A | 4/2004 |
| JP | 2004166746 A | 6/2004 |
| WO | 9851384 A1 | 11/1998 |
| WO | 2010087090 A1 | 8/2010 |
| WO | 2011109454 A1 | 9/2011 |
| WO | 2012078668 | 6/2012 |
| WO | 2012139083 A1 | 10/2012 |

OTHER PUBLICATIONS

Changing the Virtual Self: Avatar Transformations in Popular Games; Barr et al., Victoria Univ., NZ, 2006.

(56) References Cited

OTHER PUBLICATIONS

Real-Time Multimodal Human—Avatar Interaction; Li et al., IEEE (Video Technology) vol. 18, No. 4, 2008.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492, Arnone, et al., filed Feb. 12, 2014.
U.S. Appl. No. 14/181,190, Arnone, et al., filed Feb. 14, 2014.
U.S. Appl. No. 14/186,393, Arnone, et al., filed Feb. 21, 2014.
U.S. Appl. No. 14/188,587, Arnone, et al., filed Feb. 24, 2014.
U.S. Appl. No. 14/185,847, Arnone, et al., filed Feb. 20, 2014.
U.S. Appl. No. 14/203,459, Arnone, et al., filed Mar. 10, 2014.
U.S. Appl. No. 14/205,272, Arnone, et al., filed Mar. 11, 2014.
WIPO/ISA, International Search Report and Written Opinion, PCT/US12/40548, Aug. 31, 2012.
U.S. Appl. No. 14/205,303, Arnone, et al., filed Mar. 11, 2014.
U.S. Appl. No. 14/205,306, Arnone, et al., filed Mar. 11, 2014.
U.S. Appl. No. 14/209,485, Arnone, et al., filed Mar. 13, 2014.
U.S. Appl. No. 14/214,310, Arnone, et al., filed Mar. 14, 2014.
U.S. Appl. No. 14/222,520, Arnone, et al., filed Mar. 21, 2014.
U.S. Appl. No. 14/253,813, Arnone, et al., filed Apr. 15, 2014.
U.S. Appl. No. 14/255,253, Arnone, et al., filed Apr. 17, 2014.
U.S. Appl. No. 14/255,919, Arnone, et al. filed Apr. 17, 2014.
U.S. Appl. No. 14/263,988, Arnone, et al. filed Apr. 28, 2014.
U.S. Appl. No. 14/270,335, Arnone, et al. filed May 5, 2014.
U.S. Appl. No. 14/271,360, Arnone, et al. filed May 6, 2014.
U.S. Appl. No. 13/961,849, Arnone, et al. filed Aug. 7, 2013.
U.S. Appl. No. 13/746,850, Arnone, et al. filed Jan. 22, 2013.
U.S. Appl. No. 14/288,169, Arnone, et al. filed May 27, 2014.
U.S. Appl. No. 14/304,027, Arnone, et al. filed Jun. 13, 2014.
U.S. Appl. No. 14/306,187, Arnone, et al. filed Jun. 16, 2014.
U.S. Appl. No. 14/312,623, Arnone, et al. filed Jun. 24, 2014.
U.S. Appl. No. 14/330,249, Arnone, et al. filed Jul. 14, 2014.
U.S. Appl. No. 14/339,142, Arnone, et al. filed Jul. 23, 2014.
U.S. Appl. No. 14/458,206, Arnone, et al. filed Aug. 12, 2014.
U.S. Appl. No. 14/461,344, Arnone, et al. filed Aug. 15, 2014.
U.S. Appl. No. 14/462,516, Arnone, et al. filed Aug. 18, 2014.
U.S. Appl. No. 14/467,646, Meyerhofer, et al. filed Aug. 25, 2014.
U.S. Appl. No. 14/474,023, Arnone, et al. filed Aug. 29, 2014.

* cited by examiner

SYSTEMS AND METHODS FOR REGULATED HYBRID GAMING

CROSS-REFERENCE TO RELATED APPLICATIONS

The current application is a continuation of U.S. patent application Ser. No. 14/181,190, filed on Feb. 14, 2014, and issued as U.S. Pat. No. 8,821,270 on Sep. 2, 2014, which is a continuation of U.S. patent application Ser. No. 13/855,676, filed on Apr. 2, 2013, and issued as U.S. Pat. No. 8,668,581 on Mar. 11, 2014, which is a continuation of PCT Patent Application No. PCT/US12/40548 filed Jun. 1, 2012 which claims priority to U.S. Provisional Patent Application No. 61/519,914, filed Jun. 1, 2011, the disclosures of each of which are incorporated herein by reference.

FIELD

The present disclosure is generally related to gaming and more specifically to monitoring and controlling a hybrid game that includes both a gambling game and an entertainment game.

BACKGROUND

The gaming machine manufacturing industry has traditionally developed gaming machines with a gambling game. A gambling game is typically a game of chance, which is a game where the outcome of the game is generally dependent on chance (such as a slot machine). A game of chance can be contrasted with a game of skill where the outcome of the game may depend upon a player's skill with the game. Gambling games are typically not as interactive and do not include graphics as sophisticated as an entertainment game, which is a game of skill such as a video game.

Entertainment games may include Digital Rights Management (DRM) components to ensure that unauthorized copies of an entertainment game are not being used. However, the operations of conventional entertainment games are not typically regulated by a regulatory authority. Furthermore, the DRM components typically do not provide the features that are used to monitor and control a game for a regulatory authority.

SUMMARY

Systems and methods in accordance with embodiments of the invention regulate a hybrid game utilizing a regulatory scanning and screening audit (RSSA) module to detect and/or defeat unauthorized use of the hybrid game. One embodiment includes a method of detecting unauthorized operation of a hybrid game, comprising: collecting by a regulatory scanning and screening audit (RSSA) module via a network, first game operating performance data (GOPD) from a plurality of hybrid games while the plurality of hybrid games are being played by a plurality of players, the first GOPD comprising first game world credit information for first game world credit accrued by the plurality of players as a function of the plurality of players' demonstrated skill at a plurality of entertainment games of the plurality of hybrid games, and first real credit information for first real credit committed by the plurality of players to a plurality of gambling games of the plurality of hybrid games as triggered by the plurality of players skillful play of the plurality of entertainment games to accrue the first game world credit; generating by the RSSA module a reference profile using the first GOPD, the reference profile including determining a first rate of accrual of the first game world credit by the plurality of players and a first rate of commitment of the first real credit by the plurality of players; generating by the RSSA module a reference profile using the first GOPD, the reference profile a statistical model of entertainment game play outcomes; collecting by the RSSA module via the network, second GOPD from the hybrid game while the hybrid game is being played by a second player, the second GOPD comprising second game world credit information for second game world credit accrued by the second player during play of an entertainment game of the hybrid game as a function of the second player's demonstrated skill at the entertainment game of the hybrid game, and second real credit information for second real credit committed by the second player to a gambling game of the hybrid game as triggered by the second player's play of the entertainment game of the hybrid game to accrue the second game world credit; determining by the RSSA module a second rate of accrual of the second game world credit by the second player and a second rate of commitment of the second real credit by the second player; determining by the RSSA module whether the second player is operating the hybrid game in an unauthorized manner by comparing the reference profile to the rate of accrual of the second game world credit by the second player and the rate of commitment of the second real credit by the second player; and generating by the RSSA module a notification to an operator of the hybrid game upon determination that the second player is operating the hybrid game in an unauthorized manner, based on the comparison of the second entertainment game play outcomes to the statistical model of entertainment game play.

In another embodiment, the second GOPD includes user interface key sequences, and determining whether the second player is operating the hybrid game in an unauthorized manner includes determining if a unique combination of user interface key sequences are present in the second GOPD that are known to enable unauthorized operation of the entertainment game.

In some embodiments, the second GOPD includes game object information describing game objects used in the entertainment portion of the hybrid game, and determining whether the second player is operating the hybrid game in an unauthorized manner includes determining if known cheat objects have appeared in the entertainment game by using the game object information.

In another embodiment, the first GOPD includes first entertainment game play performance and the second GOPD includes second entertainment game play performance, and determining whether the second player is operating the hybrid game in an unauthorized manner includes if the second game play performance is superior to the first game play performance.

In various embodiments, the first entertainment game play performance and second entertainment game play performance includes rate of scoring information, and determining whether the second player is operating the hybrid game in an unauthorized manner includes comparing the first entertainment game play performance and the second entertainment game play performance to determine when the second player's rate of scoring is not supported by authorized hybrid game operation.

In some embodiments, the first GOPD and second GOPD includes entertainment game progression information, and determining whether the second player is operating the hybrid game in an unauthorized manner includes detection of a change in entertainment game progression.

In another embodiments, an apparatus for detecting unauthorized operation of a hybrid game is provided. The apparatus comprises one or more processors, and memory storing processor-executable instructions coupled to the one or more processors, the processor-executable instructions when executed by the one or more processors cause the one or more processors to preform a process comprising collecting via a network, first game operating performance data (GOPD) from a plurality of hybrid games while the plurality of hybrid games are being played by a plurality of players, the first GOPD comprising first game world credit information for first game world credit accrued by the plurality of players as a function of the plurality of players' demonstrated skill at a plurality of entertainment games of the plurality of hybrid games, and first real credit information for first real credit committed by the plurality of players to a plurality of gambling games of the plurality of hybrid games as triggered by the plurality of players skillful play of the plurality of entertainment games to accrue the first game world credit, generating a reference profile using the first GOPD, the reference profile including determining a first rate of accrual of the first game world credit by the plurality of players and a first rate of commitment of the first real credit by the plurality of players, generating by the RSSA module a reference profile using the first GOPD, the reference profile a statistical model of entertainment game play outcomes, collecting via the network, second GOPD from the hybrid game while the hybrid game is being played by a second player, the second GOPD comprising second game world credit information for second game world credit accrued by the second player during play of an entertainment game of the hybrid game as a function of the second player's demonstrated skill at the entertainment game of the hybrid game, and second real credit information for second real credit committed by the second player to a gambling game of the hybrid game as triggered by the second player's play of the entertainment game of the hybrid game to accrue the second game world credit, determining a second rate of accrual of the second game world credit by the second player and a second rate of commitment of the second real credit by the second player, determining by the RSSA module whether the second player is operating the hybrid game in an unauthorized manner by comparing the reference profile to the rate of accrual of the second game world credit by the second player and the rate of commitment of the second real credit by the second player, and generating by the RSSA module a notification to an operator of the hybrid game upon determination that the second player is operating the hybrid game in an unauthorized manner, based on the comparison of the second entertainment game play outcomes to the statistical model of entertainment game play.

In another embodiment, a non-transitory machine-readable media stores processor-executable instructions, the processor-executable instructions when executed by one or more processors cause the one or more processors to perform a process comprising collecting via a network, first game operating performance data (GOPD) from a plurality of hybrid games while the plurality of hybrid games are being played by a plurality of players, the first GOPD comprising first game world credit information for first game world credit accrued by the plurality of players as a function of the plurality of players' demonstrated skill at a plurality of entertainment games of the plurality of hybrid games, and first real credit information for first real credit committed by the plurality of players to a plurality of gambling games of the plurality of hybrid games as triggered by the plurality of players skillful play of the plurality of entertainment games to accrue the first game world credit, generating a reference profile using the first GOPD, the reference profile including determining a first rate of accrual of the first game world credit by the plurality of players and a first rate of commitment of the first real credit by the plurality of players, generating by the RSSA module a reference profile using the first GOPD, the reference profile a statistical model of entertainment game play outcomes, collecting via the network, second GOPD from the hybrid game while the hybrid game is being played by a second player, the second GOPD comprising second game world credit information for second game world credit accrued by the second player during play of an entertainment game of the hybrid game as a function of the second player's demonstrated skill at the entertainment game of the hybrid game, and second real credit information for second real credit committed by the second player to a gambling game of the hybrid game as triggered by the second player's play of the entertainment game of the hybrid game to accrue the second game world credit, determining a second rate of accrual of the second game world credit by the second player and a second rate of commitment of the second real credit by the second player, determining by the RSSA module whether the second player is operating the hybrid game in an unauthorized manner by comparing the reference profile to the rate of accrual of the second game world credit by the second player and the rate of commitment of the second real credit by the second player, and generating by the RSSA module a notification to an operator of the hybrid game upon determination that the second player is operating the hybrid game in an unauthorized manner, based on the comparison of the second entertainment game play outcomes to the statistical model of entertainment game play.

DETAILED DESCRIPTION

Figure 1:
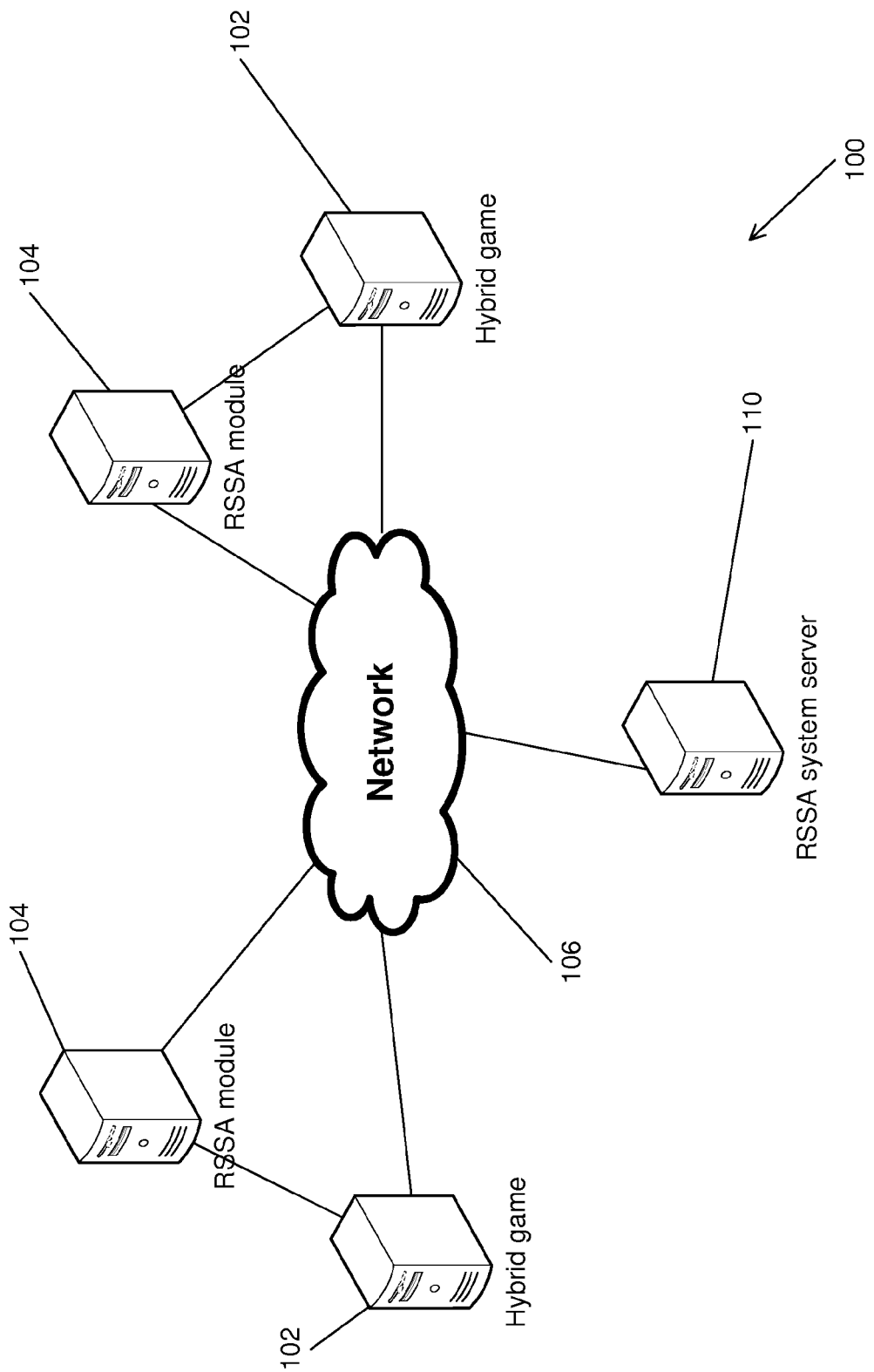
FIG. 1 illustrates a system diagram of a regulated hybrid games in accordance with an embodiment of the invention.

Turning now to the drawings, systems and methods for a hybrid game regulated by a regulatory scanning and screening audit (RSSA) module are illustrated. In many embodiments, the RSSA module enables regulation of the hybrid game (such as by a regulatory authority) by logging, detecting and defeating the use of cheats, or other unauthorized hybrid game performance. In several embodiments, a hybrid game is a game that integrates both a gambling game that includes a real world engine (RWE) which manages the gambling portion of a game, as well as an entertainment game that includes a game world engine (GWE) that manages the entertainment portion of a game, and an entertainment software engine (ESE) that executes the game for user entertainment. In certain embodiments, the hybrid game also includes a user interface associated with either or both the gambling game and the entertainment game. Various hybrid games are discussed in Patent Cooperation Treaty Application No. PCT/US11/

26768, filed Mar. 1, 2011, entitled "ENRICHED GAME PLAY ENVIRONMENT (SINGLE and/or MULTI-PLAYER) FOR CASINO APPLICATIONS" and Patent Cooperation Treaty Application No. PCT/US11/63587, filed Dec. 6, 2011, entitled "ENHANCED SLOT-MACHINE FOR CASINO APPLICATIONS" each disclosure of which is hereby incorporated by reference in its entirety. The RWE, GWE and ESE are also discussed further below.

The RSSA module can monitor a hybrid game through tap points from which the RSSA module can collect data about the hybrid game. The tap points can capture data from the hybrid game at any point of operation within the hybrid game. The RSSA module can also control the hybrid game through control signals sent from the RSSA module to the hybrid game. In several embodiments, the RSSA module is part of an RSSA system that monitors and controls several RSSA modules. The RSSA module can also include a number of operating modes, such as a game supervisory mode, a game profile learning mode, operating monitor mode, audit mode and playback mode. Each operating mode may also include a number of sub-functions such as where an operating monitor mode includes a player profiling, keystroke scanning or game session recording sub-function. These modes enable the hybrid game to learn a profile and to monitor the operation of the hybrid game to detect unauthorized usage of a hybrid game (such as with a cheat).

In numerous embodiments, a regulatory body or an auditor can utilize an RSSA module or RSSA system to ascertain the fairness of the system by determining that the entertainment portion of the hybrid game is not being manipulated by a player through the unauthorized use of the hybrid game, such as (but not limited to) through use of cheats or other methods which may have been embedded in the entertainment game. The nature of unauthorized use, such as cheats, is especially harmful in the context of a gambling experience, where cheats can be destructive to the fairness of the system.

System architectures for a hybrid game regulated by a regulatory scanning and screening audit (RSSA) module in accordance with various embodiments are discussed further below.

Systems for Regulating Hybrid Games

In many embodiments, a hybrid game provides players with high levels of entertainment content with a game of skill in their gambling experience. These hybrid games provide a random outcome independent of player skill while ensuring that the user's gaming experience (as measured by obstacles/challenges encountered, time of play and other factors) is shaped by the player's skill. Hybrid games also provide for players to gain entry into subsequent competitions through the accumulation of game world credits (GWC) that accrue as a function of the user's demonstrated skill at the game. These competitions can pit individual players or groups of players against one another and/or against the casino to win prizes based upon a combination of chance and skill. These competitions may be either asynchronous events, whereby players participate at a time and/or place of their choosing, or they may be synchronized events, whereby players participate at a specific time and/or venue. A regulatory scanning and screening audit (RSSA) module in accordance with many embodiments can be utilized across a network to regulate a hybrid game.

A system diagram showing a number of networked hybrid games that are regulated in accordance with an embodiment is illustrated in FIG. 1. The system 100 includes numerous hybrid games 102, each connected with and regulated by an RSSA module 104. In several embodiments, the RSSA modules 104 that regulate the hybrid games are monitored by an RSSA system server 110. In the illustrated embodiment, the hybrid games 102, RSSA modules 104 and RSSA system server 110 communicate via a network. In several embodiments, hybrid games 102 can be connected by a network 106 on a casino floor, and/or be connected to a network (such as a wide area network) to an RSSA system server 110 which can control various aspects of the hybrid gaming environment, provide regulatory body monitoring, financial accounting and forms of frequent player monitoring for marketing purposes. In various embodiments, the network 106 is the Internet. In many embodiments, an RSSA system can include one or more RSSA modules 104 along with one or more RSSA system servers 110, which collect data and coordinate the activities of the RSSA modules 104.

Although a specific system architecture for a regulated hybrid game is discussed above, any of a variety of system architectures of a regulated hybrid game can be utilized as appropriate to the requirements of a specific application in accordance with embodiments of the invention. In many embodiments, aspects of the regulated hybrid game may be distributed over one or more pieces of hardware and/or software, such as some elements running on a remote server, or on a server in the "cloud" (located over the Internet in a different location). In many embodiments, a RSSA module and/or RSSA system contains a hardware and/or software system that accepts data from a hybrid game to which it is connected and performs monitoring of the hybrid game operation to profile live operation against a pre-determined set of data. Certain embodiments include storage of game reference profiles and an analysis module (each of which are discussed below) in a centralized server, leaving other data collection and log file storage local with the actual physical hybrid game. Regulation of a hybrid game from an RSSA module utilizing taps and control signals in accordance with various embodiments of the invention are discussed below.

Regulation of Hybrid Games

Regulatory scanning and screening audit (RSSA) modules in accordance with many embodiments of the invention can utilize taps to obtain information concerning a hybrid game. The information garnered from the taps can be utilized to analyze the hybrid game and to regulate and control the hybrid game. In some embodiments, the taps are located within the hybrid game's control logic. The taps collect data from the hybrid game and forward the data to the RSSA. In other embodiments, the taps are part of message communication control logic of a host hosting the hybrid game. The message communication control logic traps messages sent between components of the hybrid game and transmits these messages to the RSSA. In yet other embodiments, the taps are included in control logic that reads game state data and resource data stored and used by the hybrid game and transmits the read game state data and resource data to the RSSA during the operation of the hybrid game.

Figure 2:
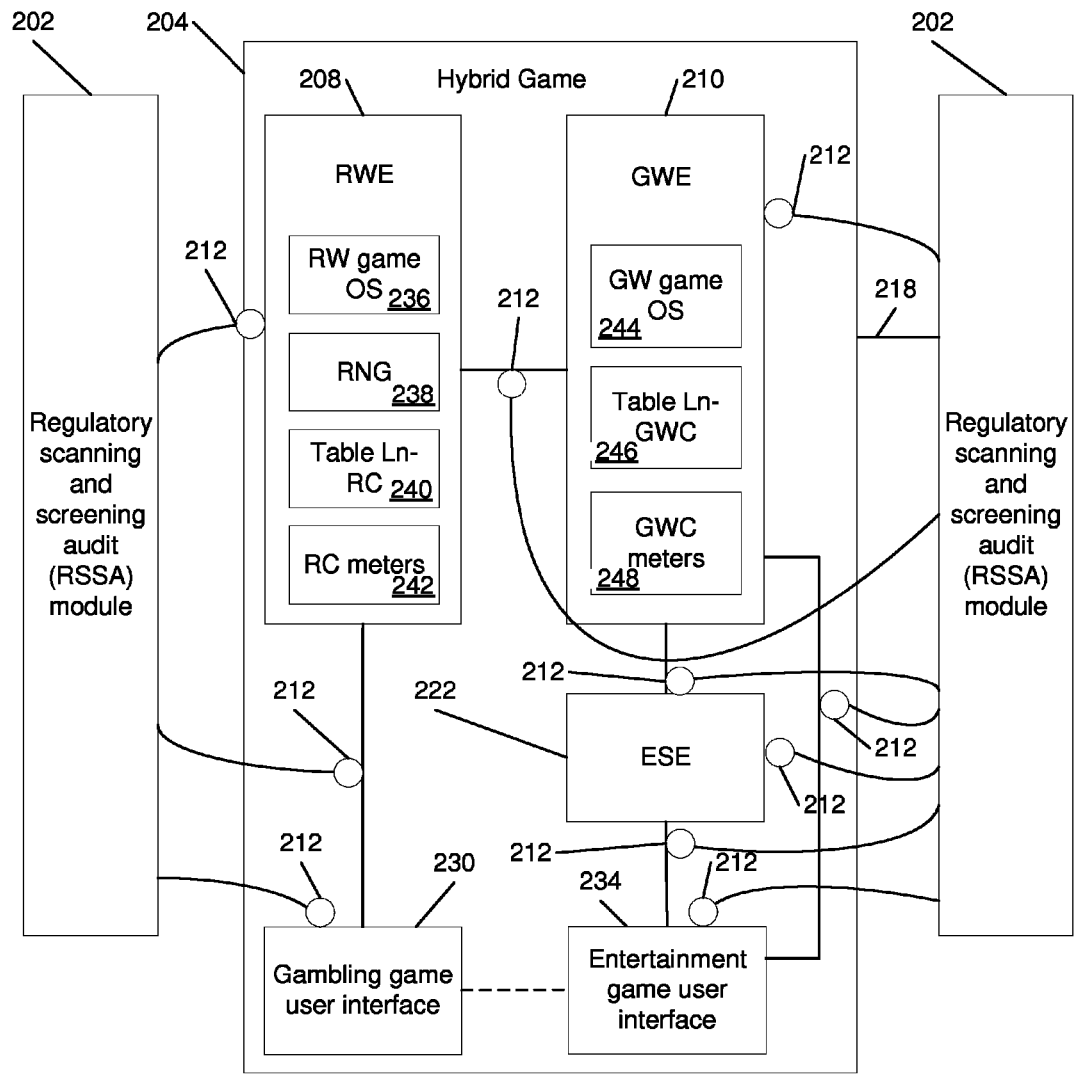
FIG. 2 illustrates the placement of taps and within a regulated hybrid game in accordance with an embodiment of the invention.

A conceptual diagram illustrating the placement of taps within the electronics of a hybrid game to enable an RSSA module to monitor the hybrid game in accordance with an embodiment is illustrated in FIG. 2. The hybrid game 204 includes a RWE 208, GWE 210 and ESE 222 and gambling game user interface 230 and entertainment game user interface 234. The two user interfaces may be part of the same user interface but are separate in the illustrated embodiment. The RSSA module 202 can intersperse taps 212 to monitor any portion of the hybrid game 204, such as directly at the RWE 208, GWE 210, ESE 222, or at the user interface for the gambling game 230 or the entertainment game 234. These taps allow the RSSA module 202 to aggregate and analyze data concerning the hybrid game to reduce the likelihood that the hybrid game is being utilized in an unauthorized manner (such as with a cheat). The RSSA module 202 can also control the hybrid game through control signals sent to the hybrid game 204. In many embodiments, the RSSA module 202 is implemented as a plurality of separate modules that communicate with an RSSA system server. The RWE 208, GWE 210, ESE 222 and the RSSA module 202 are discussed further below.

In several embodiments, The RWE 208 functions as an operating system for the gambling game of the hybrid game 204 and controls and operates the gambling game. The operation of a gambling game is enabled by real funds, accretes and declinates real gambling credits based on random gambling outcome, and whose gambling proposition is typically regulated by gaming control bodies. In many embodiments, the RWE 208 includes a real world (RW) operating system (OS) 236, random number generator (RNG) 238, level "n" real-world credit pay tables (Table Ln-RC) 240, RC meters 242 and other software constructs that enable a game of chance to offer a fair and transparent gambling proposition, and to include the auditable systems and functions that can enable the game to obtain gaming regulatory body approval.

A random number generator (RNG) 238 includes software and/or hardware algorithms and/or processes that are used to generate random or pseudorandom outcomes. A level n real-world credit pay table (Table Ln-RC) 240 is a table that can be used in conjunction with a random number generator to dictate the real world credits (RC) earned as a function of game play and is analogous to the pay tables used in a conventional slot machine. Table Ln-Rc payouts are independent of player skill. There may be one or a plurality of Table Ln-Rc pay tables contained in a gambling game, the selection of which may be determined by game progress a player has earned, and bonus rounds which a player may be eligible for. Real world credits (RC) are credits analogous to slot machine game credits which are entered into a gambling game by the user, either in the form of hard currency or electronic funds. RCs can be decremented or augmented based on the outcome of a random number generator according to the Table Ln-Rc real world credits pay table, independent of player skill. In certain embodiments, an amount of RC can be required to enter higher ESE game levels. RC can be carried forward to higher game levels or paid out if a game cash out is opted for by a player. The amount of RC required to enter a specific level of the game "level n" need not be the same for each level.

In many embodiments, the GWE 210 manages the overall hybrid game operation, with the RWE 208 and the ESE 222 effectively being support units to the GWE 210. In several embodiments, the GWE 210 contains mechanical, electronic and software system for an entertainment game. The GWE includes a game world (GW) game operating system (OS) 244 that provides control of the entertainment game. The GWE additionally contains a level "n" game world credit pay table (Table Ln-GWC) 246 indicating where to take input from this table to affect the play of the entertainment game. The GWE can further couple to the RWE 208 to determine the amount of RC available on the game and other metrics of wagering on the gambling game (and potentially affect the amount of RC in play on the RWE 208). The GWE additionally contains various audit logs and activity meters (such as the GWC meter 248). The GWE can also couple to a centralized server for exchanging various data related to the player and their activities on the game. The GWE furthermore couples to the ESE 222.

In many embodiments, a level "n" game world credit pay table (Table Ln-GWC) 246 dictates the GWC earned as a function of player skill in the nth level of the game. The payouts governed by this table are dependent upon player skill and game play at large and may or may not be coupled to a random number generator. In several embodiments, game world credits (GWC) are player points earned or depleted as a function of player skill, i.e. as a function of player performance in the context of the game. GWC is analogous to the "score" in a typical video game. Each game has one or more scoring criterion, embedded within the Table Ln-GWC 246 that reflects player performance against the goal(s) of the game. GWC can be carried forward from one level of game play to another, and ultimately paid out in various manners such as directly in cash, or indirectly such as earning entrance into a sweepstakes drawing, or earning participation in, or victory in, a tournament with prizes. GWC may be stored on a player tracking card or in a network-based player tracking system, where the GWC is attributed to a specific player.

In some embodiments, the operation of the GWE 210 does not affect the RWE's 208 gambling operation except for player choice parameters that are allowable in slot machines today, such as the wager amount, how fast the player wants to play (by pressing a button or pulling the slot's handle), agreement to wager into a bonus round, etc. In this sense, the RWE provides a fair and transparent, non-skill based gambling proposition co-processor to the GWE. In the illustrated embodiment, the communication link shown between the GWE 210 and the RWE 208 allows the GWE 210 to obtain information from the RWE 208 as to the amount of RC available in the gambling game. The communication link can also convey a necessary status operation of the RWE (such as on-line or tilt). The communication link can further communicate the various gambling control factors which the RWE 208 uses as input, such as the number of RC consumed per game or the player's election to enter a jackpot round. In FIG. 2, the GWE 210 is also shown as connecting to the player's user interface directly, as this may be necessary to communicate certain entertainment game club points, player status, control the selection of choices and messages which a player may find useful in order to adjust their entertainment game experience or understand their gambling status in the RWE 208.

In various embodiments, the ESE 222 manages and controls the visual, audio, and player control for the entertainment game. In certain embodiments, the ESE 222 accepts input from a player through a set of hand controls, and/or head, gesture, and/or eye tracking systems and outputs video, audio and/or other sensory output to a user interface. In many embodiments, the ESE 222 can exchange data with and accept control information from the GWE 210. In several embodiments an ESE 222 can be implemented using a personal computer (PC), a mobile device such as a smartphone, a tablet computer, a personal digital assistant, a Sony PlayStation® (a video game console developed by Sony Computer Entertainment of Tokyo Japan), or Microsoft Xbox® (a video game console developed by Microsoft Corporation of Redmond, Wash.) running a specific game program.

The ESE 222 operates mostly independently from the GWE 210, except that via their interface, the GWE 210 may send certain GW game control parameters to the ESE 222 to affect the entertainment game's play, such as (but not limited to) what level of character to be used, changing the difficulty level of the game, changing the type of game object, such as a gun or a car, in use, requesting potions to become available or to be found by the character, etc. The ESE 222 can accept this input from the GWE 210, make adjustments, and continue the play action all the while running seamlessly from the player's perspective. The ESE's 222 operation is mostly skill based, except for where the ESE's algorithm may inject complexities into the game by chance in its normal operation to create unpredictability in the entertainment game. Utilizing this interface, the ESE may also communicate player choices made in the game to the GWE 210, such as selection of a different gun, the player picking up a special potion in the GW environment, etc.

In other embodiments, operation of an entertainment game of a hybrid game by a player consumes one or more enabling elements (EEs) within the entertainment game. An EE is an element that is consumed by, traded or exchanged in, operated upon, or used to enable the entertainment game portion of the hybrid game. There may be one or more types of EE present in the hybrid game's entertainment game. Examples of EE include bullets in a shooting game, fuel in a racing game, letters in a word spelling game, downs in a football game, potions in a character adventure game, character health points, etc. The GWE can associate consumption of an EE with the commitment or wager of RC to a gambling game of the hybrid game whereby commitment or wagering of the RC in the gambling game is coordinated with the consumption of the EE in the entertainment game because of actions of the player. Furthermore, the GWE can provide an increment or decrement of EE available to the player in coordination with the gambling outcome of the gambling game such as by incrementing the EE when RC is won or decrementing EE when RC is lost.

The GWE's job in this architecture, being interfaced thusly to the ESE, is to allow the transparent coupling of entertainment software to a fair and transparent random chance gambling game, providing a seamless perspective to the player that they are playing a typical popular entertainment game (which is skill based). In certain embodiments, the ESE 222 can be used to enable a wide range of games including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.), etc.). Providers of such software can provide the previously described interface by which the GWE 210 can request amendments to the operation of the ESE software in order to provide the seamless and sensible operation of the hybrid game as both a gambling game and an entertainment game.

In several embodiments, the RWE 208 can accept a trigger to run a gambling game in response to actions taken by the player in the entertainment game as conveyed by the ESE 222 to the GWE 210, or as triggered by the GWE 210 based on the GWE's control logic, in the background to the overall game from the player's perspective, and can provide information to the GWE 210 to expose the player to certain aspects of the gambling game, such as (but not limited to) odds, amount of RC in play, and amount of RC available. The RWE 208 can accept modifications in the amount of RC wagered on each individual gambling try, or the number of games per minute the RWE 208 can execute, entrance into a bonus round, and other factors, all the while these factors can take a different form than that of a typical slot machine. An example of a varying wager amount that the player can choose might be that they have decided to play with a more powerful character in the game, or having a more powerful gun, a better car, etc. These choices can increase or decrease the amount wagered per individual gambling game, in the same manner that a standard slot machine player may decide to wager more or less credits for each pull of the handle. In several embodiments, the RWE 208 can communicate a number of factors back and forth to the GWE 210, via their interface, such as an increase or decrease in a wager being a function of the player's decision making as to their operational profile in the entertainment game (i.e. power of the character, gun selection, car choice, etc.). In this manner, the player is always in control of the per game wager amount, with the choice mapping to some parameter or component which is applicable to the entertainment game experience of the hybrid game. In a particular embodiment, the RWE operation can be a game of chance running every 10 seconds where the amount wagered is communicated from the GWE 210 as a function of choices the player makes in the operation profile in the entertainment game such as those cited above.

In many embodiments, a hybrid game integrates a video game style gambling machine, where the gambling game (i.e. RWE 208 and RC) is not player skill based, while at the same time allows players to use their skills to earn club points which a casino operator can translate to rewards, tournaments opportunities and prizes for the players. The actual exchange of monetary funds earned or lost directly from gambling against a game of chance, such as a slot machine, is preserved. At the same time a rich environment of rewards to stimulate "gamers" can be established with the entertainment game. In several embodiments, the hybrid game can leverage very popular titles with "gamers" and provides a sea change environment for casinos to attract players with games that are more akin to the type of entertainment which a younger generation desires. In various embodiments, players can use their skill towards building and banking GWC which in turn can be used to win tournaments and various prizes as a function of their "gamers" prowess. Numerous embodiments minimize the underlying changes needed to the aforementioned entertainment software (Gears of War, etc.), for the hybrid game to operate within an entertainment game construct, thus making a plethora of complex game titles and environments, rapid and inexpensive to deploy in a gambling environment.

In several embodiments, a regulatory scanning and screening audit (RSSA) 202 module protects against unauthorized activities in a hybrid game (such as cheats). The RSSA module 202 can receive information from the hybrid game from taps 212 and control the hybrid game with control signals 218. A tap 212 can be a point from which an RSSA module gathers information concerning the hybrid game. In the illustrated embodiment, numerous taps 212 are utilized by the RSSA 202 module to gather information concerning the hybrid game 204. The RSSA module 202 can tap aspects of the electronics that enable the gambling game, such as the RWE 208, communication between the RWE 208 and the gambling game user interface 230, and/or the gambling game user interface itself 230. Likewise, the RSSA module 202 can tap 212 aspects of the electronics that enables the entertainment game, such as the GWE 210, ESE 222, entertainment game user interface 234 or communication between the GWE 210 and ESE 222, or between the ESE 222 and the entertainment game user interface 234. Likewise, the RSSA module 202 can tap 212 communication between the RWE 208 and GWE 210. The information concerning the hybrid game garnered through taps enables the RSSA module to collate and analyze the data to determine if any unauthorized use of the hybrid game has occurred (such as a cheat). In certain embodiments, information gathered from the taps can be utilized to build a reference profile that can be utilized during game play sessions of the hybrid game to determine if unauthorized use of the hybrid game has occurred.

The illustrated embodiment includes control signals 218 sent to the hybrid game 204 from the RSSA module 218 to communicate with and control the hybrid game 204, including but not limited to suspending the hybrid game 204 or only enabling certain functions of a hybrid game 204 as described below, by signaling the GWE 210, RWE 208, ESE 222 or some other hybrid game 204 element.

In many embodiments, a RSSA module 202 can be part of an RSSA system including a server connected via a network to a plurality of RSSA modules, where the RSSA system can be in the Cloud or housed in a separate discrete sever and where the RSSA modules can be separate physical devices, or processes running in a larger piece of software, or any variation thereof. In several embodiments, an RSSA module 202 is connect to a RSSA system over a secure interface.

Although specific taps 212 and control signals 218 are discussed above, any of a variety of taps 212 and/or control signals 218 can be utilized by an RSSA module 202 as appropriate to the requirements of a specific application in accordance with embodiments of the invention.

Regulatory Scanning and Screening Audit (RSSA) Module

Figure 3:
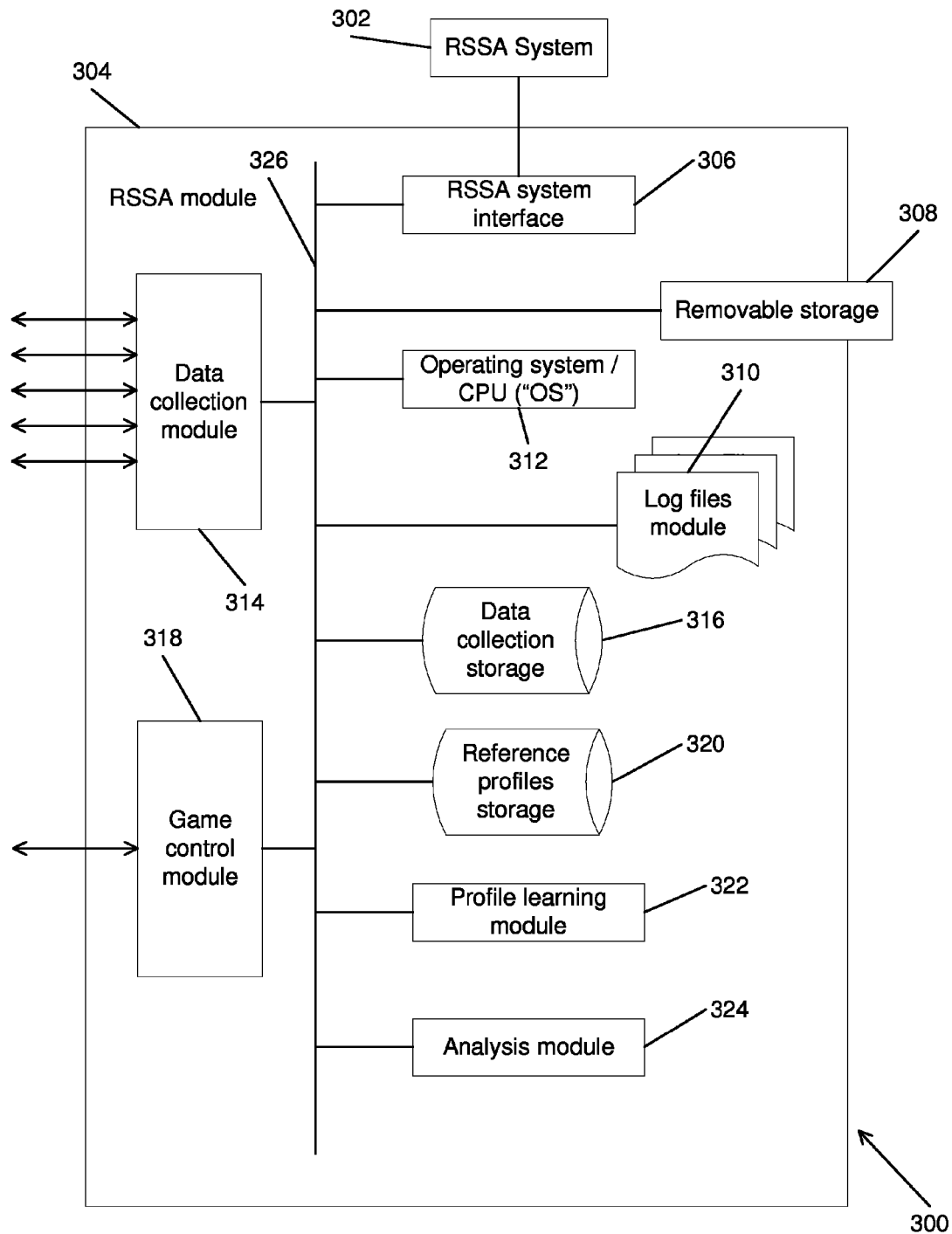
FIG. 3 illustrates a regulatory scanning and screening audit module in accordance with an embodiment of the invention.

Regulatory scanning and screening audit (RSSA) modules in accordance with many embodiments of the invention can include a data collection module from which data from taps are collected and a game control module from which a control signal is sent to the hybrid game. A regulatory scanning and screening audit (RSSA) module in accordance with an embodiment of the invention is illustrated in FIG. 3. The RSSA module 304 includes an operating system 312. The RSSA module also includes a data collection module 314 which taps into the hybrid game and contains the signaling and interface used to perform handshaking with the hybrid game and collect data output. Data collection storage 316 is included for data collected off the taps by the data collection module 314. An analysis module 324 is included that analyzes the collected data for profiling against stored profiles in the reference profiles storage 320. The RSSA module includes a log files module 310 which keeps a complete record of the activities of the RSSA module for audit purposes. The RSSA module also includes an optional RSSA system interface 306 that manages communications and data exchange with an RSSA system 302 or other centralized sever. Removable storage 308 may be utilized to take a record of log files and other data off of the RSSA module. A profile learning module 322 can be responsible for organizing signals and data for a given hybrid game when the RSSA module is in learning mode and which serves as a baseline reference for the analysis module 324 (such as but not limited to the creation of a reference profile). A game control module 318 can signal the GWE of the hybrid game to control hybrid game operation. Lastly, a data bus 326 connects the above mentioned elements of the RSSA module and other elements in the RSSA module 304 together so data and signaling may be exchanged.

In several embodiments, data collected over the taps by the data collection module 314 can be written into either of the data collection storage 316 or the reference profiles storage 320. Data collected over the taps can be termed as game operating performance data (GOPD) and may relate to hybrid game performance and any operational parameters of interest. GOPD can be used to determine if the entertainment game is operating in a manner in keeping with a hybrid game's authorized use (disclosed and approved game design). GOPD can include any data type which can be collected by the RSSA module 304 for performing its analysis functions, depending on the entertainment game type being monitored. In many embodiments, GOPD can include (but is not limited to): all operator selections and operations on the user interface, such as all the keystrokes, button presses and joystick movements made by the player; amounts and rates of RC commitment to a gambling game, amounts and rates of accumulation or loss of RC in a gambling game, a gambling result of a gambling game, amounts and rates of accumulation or loss of GWC in the entertainment game, performance or rate of operation of a game object, such as a tool, weapon or other device operated by the player/character (e.g. rate of fire of a weapon or in the case of a racing game, the top speed and handling characteristics of available cars); resource levels of a game object, such as in the case of a weapon, the amount of ammunition; success rate of a game object in its primary function, such as in the case of a weapon, its accuracy; the type of resource expended by a game object, such as in the case of a weapon, the type of ammunition in use; performance characteristics of the game character, such as in the case of a wizard, the rate at which spells are thrown, or in the case of a football player, his or hers' strength and agility; health points, stamina and other characteristics of a character's makeup, such as in the case of a fighter, the stamina level; the level or status of a character in the game, such as what level the player is on or in what part of a maze they are; the types of objects that exist in the game space, such as in the case of an adventure game, the existence of a magic dolphin to ride, or a magic carpet; the amount and type of special award object in the game space, such as in the case of an exploration game, health kits, ammo dumps or special clothing; shots fired upon and hits scored on a character by a player's adversaries in the game space, such as in the case of a shooter game, the amount of shots fired at the player and the amount of times the player is hit when being shot at by an enemy; the game virtual clock, or elapsed time in the game space; the identity of game elements which are to be awarded or intended to be drawn randomly by a player, such as in the case of a word game, the letters pulled out of the "bag" for use in spelling words, or in the case of a soccer game, the identity of players drawn by random draft; and/or a time stamped scripting sequence of all pertinent game actions, modes and/or game states which can include the data necessary to run a playback rerun of the game for review purposes.

In some embodiments, the reference profile includes a metric of game play derived from a discreet variable in the GOPD. For example, the existence of an unexpected game object or component in a game, or a known cheat game object or component, can indicate that a player is operating a game in an unauthorized manner. In a like manner, the nonexistence of an expected game object or component can indicated that the game is being operated in an unauthorized manner.

In some embodiments, the reference profile includes a metric of game play derived from one or more of the types of data collected in the GOPD. For example, the type of GOPD data collected can include a variable having continuous values, such as the number of shots fired during a gaming session. GOPD corresponding to the continuous variable can be collected for one or more reference players and a statistical model including statistical descriptors of the collected data corresponding to the variable can be determined, such as by calculating the mean and standard deviations for a according to a probability distribution. When a non-reference player is playing the game, the non-reference player's GOPD is collected and a value is extracted from the GOPD corresponding to the continuous variable. The extracted value is compared to the mean of the corresponding data in the reference GOPD and a determination is made of the difference between the extracted value and the mean of the corresponding data in the reference GOPD. If the difference exceeds a specified threshold, such as by more than two times the calculated standard deviation for the mean value, the non-reference player may be considered as operating the game in an unauthorized manner, such as by employing a cheat that enables the non-reference player to outperform a reference player.

As another example of using one or more types of data collected as GOPD, metrics may be generated by applying various functions to the one or more types of data collected as GOPD, such as determining differences, ratios, sums, products, etc. for the data values. For example, the number of hits scored by a player using a game object gun divided by the shots fired from that gun can provide a metric of the utility of the gun. Again, this metric may be treated as a continuous variable having a mean and an associated probability distribution function. If a player realizes a greater utility from the gun than reference players whose performance metrics are included in the GOPD used to generate a reference profile, it may indicate that the player is employing a cheat to obtain that greater utility.

As yet another example of using two or more types of data included in the GOPD, an amount of GWC accumulated or lost, or a rate of GWC accumulation or loss, may be used to derive a metric from other types of data included in the GOPD. Such a derived metric can include determining a ratio of an amount of GWC gained or lost during a gaming session to an amount of RC that has been committed, gained, or lost during that gaming session. In a like manner, a rate at which GWC is accumulated or lost during a gaming session may be compared to a rate at which RC is committed, won or lost during that same gaming session and can be used as a metric included in a reference profile.

Figure 4:
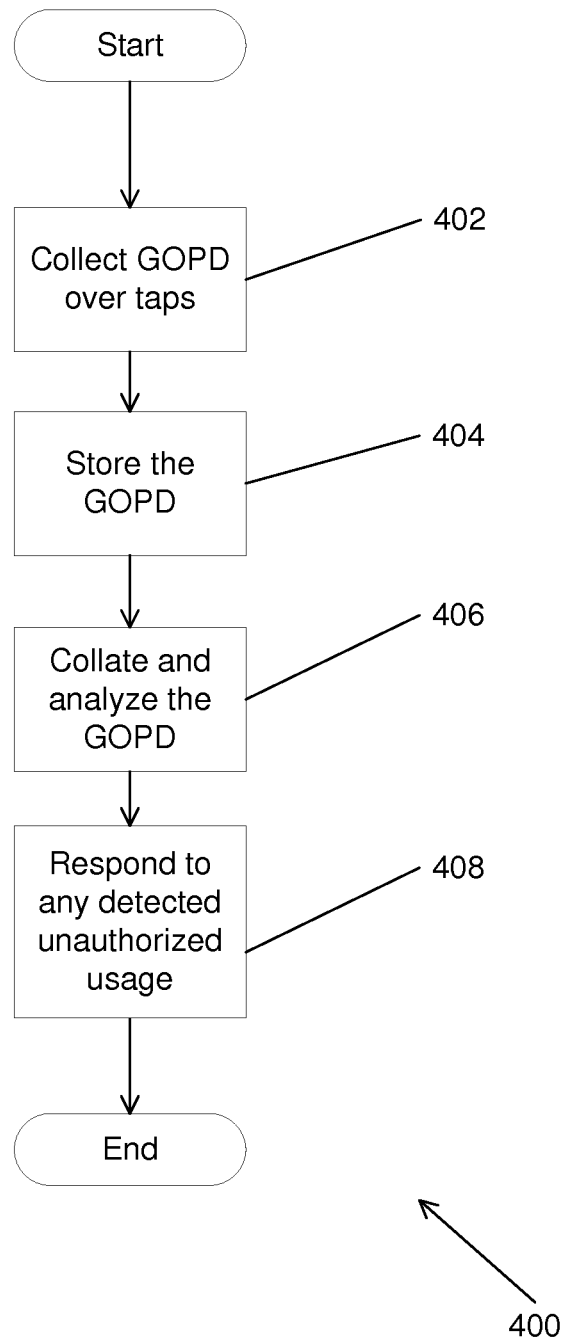
FIG. 4 illustrates a flow chart of hybrid game regulation utilizing an RSSA module in accordance with an embodiment of the invention.

A flow chart of a process for hybrid game regulation utilizing an RSSA module in accordance with an embodiment of the invention is illustrated in FIG. 4. The process 400 includes collecting (402) GOPD from a hybrid game through taps. In certain embodiments, the GOPD collected from these taps can relate to player actions (including player actions on its user interface), decisions and skill parameters or entertainment game operation metrics of a plurality of functions (scores, scores for actions, game time clocks, word spell letters, shots, accuracy, weapon types, potion types, game character parameters, health points, game object speed, etc.). After collecting (402) the GOPD, the RSSA module stores (404) the GOPD. In many numerous embodiments, a RSSA module stores a record of a game session or an internal ESE entertainment game status and flags the session as requiring investigation or being invalid upon determining that a play session is suspicious or known to be in use of an unauthorized use such as a cheat. After storing (404) the GOPD, the GOPD is collated and analyzed (406). In certain embodiments, the analysis is a comparative analysis of different live game play sessions or between a live game play session and a stored game play session. In various embodiments, an RSSA module retrieves a pre-determined set of known cheat enabling user interface control operations, and performs a comparative analysis of the user interface control operations and cheat enabling user interface control operations. After analyzing (406) the GOPD, the RSSA module responds (408) to any detected unauthorized usage (such as a cheat). In many embodiments, the response includes signaling the hybrid game to suspend its operation, sound an alarm, and intercept user interface actions known to enable unauthorized use so that the unauthorized use is not communicated to the hybrid game, playing back a hybrid gaming session for further analysis or post some other notification to hybrid game operator personnel (such as casino personnel).

In some embodiments, a comparative analysis is made of In some embodiments, a comparative analysis is made between an individual's game play profile and a reference profile to determine if the player's profile indicates that the player's game play performance is superior to the game play performance reference profile. The determination can be made by comparing individual types of data in the GOPD collected for the player to the same types of data contained in the GOPD of the reference profile. If the player has achieved higher levels of certain types of data, that is a superior performance, it can be determined that the player might be engaged in some form of cheating. For example, if the rate that the player is accumulating GWC is higher than a rate of GWC accumulation in accordance with the reference profile, it can be determined that the player is employing a cheat. Any of the types of data collected in the GOPD, or combinations of types of the collected data to derive a metric, described herein may be used in such a comparative analysis.

In additional embodiments, a RSSA module can retrieve pre-stored information related to hybrid game sessions, including but not limited to audit logs, time stamped events, analysis, and raw performance and operation data, and sends the data to an RSSA system to which it is connected. In other embodiments, a RSSA module retrieves pre-stored information related to hybrid game sessions, including but not limited to audit logs, time stamped events, analysis, and raw performance and operation data, and sends the data to a removable memory device.

Although a specific RSSA module is discussed above, any of a variety of RSSA modules can be utilized as appropriate to the requirements of a specific application in accordance with embodiments of the invention. In numerous embodiments, various components of the RSSA module can be implemented in either hardware or software. In certain embodiments, some or the entire RSSA module may exist as software in the GWE, the hybrid game or a server to which the hybrid game is connected. In a number of embodiments, the hybrid game itself to which the RSSA module interfaces may exist in the cloud or a remote sever, and in such implementations, the entire RSSA, or portions thereof, including data collection taps and control line signals, may only be comprised solely of software running on a server or in the cloud, or some variation thereof. Exemplary operating modes and functions of an RSSA module are discussed below.

Regulatory Scanning and Screening Audit (RSSA) Operating Modes

In a number of embodiments, an RSSA module is configured to operate in a variety of modes to facilitate the regulation of a hybrid game. A variety of these modes can be utilized as part of a process to regulate a hybrid game similar to the process illustrated above in FIG. 4. Although specific operating modes are discussed below, RSSA modules in accordance with embodiments of the invention can be implemented using a single or multiple operating modes including none, some or all of the operating modes discussed below.

Game Profile Learning Mode

Game profile learning mode in accordance with many embodiments includes connecting the RSSA module to the hybrid game to collect GOPD over the taps and to analyze and collate GOPD while one or more reference players plays the entertainment game in its various levels and options. The resultant profile generated from the reference players is stored in the reference profiles storage for later recall. The net result of this functionality is to effectively map out typical game behavior and create a reference standard used by the operating monitor mode. This mode may also operate as a sub-function of the operating monitor mode, where it can continuously monitor live entertainment game play, performing various analyses and collating data of game play sessions seeking to develop an ever improving reference profile of a particular game. The data collected in the game profile learning mode can then be shared by the RSSA module with an RSSA system, which in many embodiments can organize, analyze and condense information on various game profiles from the plurality of RSSAs to which it is connected.

In some embodiments, a reference profile is generated based on the game play of a single player, and the reference profile is stored along with an association of the reference profile with an identification of the player, thus creating a reference profile that is identified with the player. Then, when the same player is identified as playing the game for which the reference profile was generated, but at a later time or location, the player's operation of the game is compared to the reference profile identified with the player for that game. In this manner, a player's own play history can be used to determine if the player has suddenly acquired a cheat and has chosen to employ it. Accordingly, the one or more reference players and the subsequent player are the same players.

In other embodiments, the reference profile is generated for a hybrid game based on the play of the hybrid game by all of the players of the hybrid game, thus including in the one or more reference players a large population of ongoing players of the hybrid game. Each player's contribution to the reference profile can be weighted or averaged into a particular metric of the reference profile depending on the type of the metric. For example, if the metric is a continuous value, such as the amount of GWC accumulated during a play session, the amount an individual player accumulated during their particular playing session is included in the summed amount of GWC accumulated over all player sessions and the count of the number of player sessions thus accounted for is incremented. If the metric is discreet, such as the identity of a particular game object that is acquired during a gaming session, the probability of acquiring that game object for any game session can be adjusted by weighting an individual event of acquiring the game object by the total number of gaming sessions that have been considered when generating such a metric for use in the reference profile.

In yet other embodiments, the reference profile is generated by an operator of the hybrid game based on the operator's preferences for operation of the hybrid game. For example, the operator may establish a specific maximum or minimum value for accumulation of GWC or some other metric. As another basis for the reference profile, the operator may take into consideration the control logic of the hybrid game and determine from that control logic what performance a hypothetical reference player might be able to achieve. For example, if the analysis of the control logic of the hybrid game determines that consumption of a specific resource in the hybrid game results in an accumulation of GWC within an expected band of values, that determination may serve as the basis for generating a reference profile.

When an RSSA system determines that an improved game reference profile had been developed, the RSSA system can push this profile over the RSSA modules in the RSSA system, improving the connected RSSA module's reference profiles. The net result of this logic and RSSA system can be a circular operation of ever improving game profiles references. Although specific examples of the game profile learning mode is discussed above, the game profile learning mode can perform using any of a variety of processes as appropriate to the requirements of a specific application in accordance with various embodiments.

Game Supervisory Mode

Game supervisory mode in accordance with many embodiments can configure the RSSA module to be responsible for signaling and communicating with the hybrid game or one of its components in order to control the hybrid game. The RSSA module and the hybrid game can include a system to support this connection to be a paired with a secure interface to prevent unauthorized access to the various controls afforded by the hybrid game to the RSSA. In certain embodiments, a game supervisory mode can freeze the hybrid game and notify the player that a live inspector can perform a hybrid game inspection should suspicious hybrid game performance activity be occurring. Standard operating procedure might dictate inspection by live casino personnel. In other embodiments, a game supervisory mode can control the hybrid game by putting the hybrid game into playback mode to aid in an inspection of a hybrid game (see playback mode below). In particular embodiments, a game supervisory mode can control a hybrid game by issuing a command to the GWE and/or the hybrid game to put a marker in the system related to that player's GWC account where an off-line investigation of the play session can take place to either certify the session as valid, or to put the session under further investigation, or to void the session. Although specific examples of the game supervisory mode are discussed above, the game supervisory mode can be performed using any of a variety of processes as appropriate to the requirements of a specific application in accordance with various embodiments.

Audit Mode

An audit mode in accordance with many embodiments involves configuring the RSSA module to retrieve various log and data files and/or files stored in the data collection storage and reference profiles storage for auditing purposes. In certain embodiments, data can be retrieved from a removable storage device or the information can be uploaded to the system over the RSSA system interface. Although specific examples of the audit mode is discussed above, the audit mode can perform in any of a variety of ways as appropriate to the requirements of a specific application in accordance with various embodiments.

Playback Mode

A playback mode in accordance with many embodiments can playback a session of the hybrid game. In certain embodiments, the playback mode can be initiated by the game supervisory mode. The playback can be generated from user interface commands and hybrid game play status scripts stored in the data collection storage during operating monitor mode can be fed to the ESE where the hybrid game can be re-run and the result watched on a video output device by an individual performing the inspection to look for unauthorized cheats or to review a flagged play session. Although specific examples of the playback mode are discussed above, the playback mode can perform in any of a variety of ways as appropriate to the requirements of a specific application in accordance with various embodiments.

Operating Monitor Mode

The operating monitor mode of an RSSA module in accordance with many embodiments can operate to monitor any aspect of a hybrid game to detect unauthorized operation (such as a cheat) of a hybrid game. In many embodiments, the operating monitor mode can monitor live entertainment game play by analyzing different aspects of a hybrid game, including but not limited to determining if a unique combination of user interface key (buttons, joystick, etc.) sequences have been pressed by the player known to enable an unauthorized cheat. The operating monitor mode can also determine if known cheat objects have appeared in the game (such as a special character, car or weapon). The operating monitor mode can additionally determine whether the game is operating within normal bounds, or if overall operation is anomalous and suspicious such that an unauthorized cheat in the game may have been enabled by a player (such suspicious performance being for example super performance out of context, a rate of scoring not supported by normal game operation or sudden interruption or modification of the game progression). Furthermore, the operating monitor mode can determine if out of range outcomes are occurring, using statistical models and other analysis to evaluate play performance and comparing it to a known distribution of outcomes.

In many embodiments, the control between the RSSA module and the hybrid game may also provide for the RSSA module obtaining information related to the operation of the GWE, the status of GWC, operation of the RWE and status of the RC. This information can be useful to determine if unauthorized use (such as a cheat) in some manner was able to impact the larger operation of the hybrid game, thus triggering the flagging of the game session or a voiding of the results.

In other embodiments, information regarding RC in a gambling game of a hybrid game is compared to information regarding GWC or EE in an entertainment game of the hybrid game, to determine if a player is operating the hybrid game in an unauthorized manner. For example, a rate of commitment of RC in the gambling game may be compared to a rate of EE consumption. The rate of commitment of RC might also be compared to a rate of accumulation of GWC. As another example, an amount of RC won as a gambling result in the gambling game may be compared to an amount of EE incremented in the entertainment game as a result of the gambling result to determine if the player is receiving an EE for a source other than in accordance with the control logic of the hybrid game. As yet another non-limiting example, an amount of GWC acquired may be compared to an amount of RC accumulated, won or lost to determine if a player is acquiring GWC from a source other than in accordance with the control logic of the hybrid game.

In some embodiments, player collusion within a group of two or more players playing a communal or head-to-head game may be detected. To do so, COPD for each of the players of the group of players is collected as each player plays the game. Each player's collected COPD is compared to a reference profile. If a first subset of one or more players of the group of players underperforms during the play of the game, as compared to the reference profile, and a second subset of one or more players of the group of players over performs during the play of the game, again as compared to the reference profile, a determination can be made that the group of players are colluding together to improve the performance in the game of the second subset of the group of players by sacrificing the playing performance of the first subset of the group of players.

Although specific examples of the operating monitor mode are discussed above, the operating monitor mode can perform in any of a variety of ways as appropriate to the requirements of a specific application in accordance with various embodiments. Furthermore, the operating monitor mode can operate as any of a number of sub-functions, as discussed below.

Player Profiling Sub-Function

A player profiling sub-function that can be utilized as part of an operating monitor mode in accordance with many embodiments involves the RSSA module building an ever more complete profile of a player (who is signed into the system under their user ID) so far as his/her skills, preferences and decision making characteristics in an entertainment game. This information, once processed into suitable form by the profile learning module, is stored in the reference profiles storage. When in operating monitor mode, the RSSA module architecture can allow this player profiling sub-function to also operate in parallel (or pseudo-parallel) during game sessions. This sub-function allows the RSSA system to validate a player's identity and to screen for and/or lock out ringers (which are players who play to build a low skill level profile in order to enter head to head tournaments and gain an unfair advantage over other players of a lower skill level classification). This functionality is intended to work in concert with a centralized RSSA system so a player profile can be monitored by any hybrid game connected to the RSSA system. As such, when a player first logs in, or once a Hybrid Game session is complete, the RSSA module can exchange player profile information with the RSSA system over its system interface. Although specific examples of the player profiling sub-function is discussed above, the player profiling sub-function can be performed using a variety of processes as appropriate to the requirements of a specific application in accordance with various embodiments.

Keystroke Scanning Sub-Function

A keystroke scanning sub-function in accordance with many embodiments scans user interactions at a user interface to monitor a hybrid game to detect any unauthorized operation of the hybrid game (such as a cheat). These user interface actions (keystrokes, joystick, button presses, etc.) by the player can be actively screened for known cheat enabling sequences. Upon detection of known cheat enabling sequences, the keystroke scanning sub-function can either flag the session to the hybrid game (such as directly to the GWE of the hybrid game), suspend operation of the hybrid game, or filter out the sequence to effectively nullify the player's attempt to enable the cheat, rendering the cheat ineffective. Although specific examples of the keystroke scanning sub-function is discussed above, the keystroke scanning sub-function can be performed using any of a variety of processes as appropriate to the requirements of a specific application in accordance with various embodiments.

Game Session Recoding Sub-Function

A game session recording sub-function in accordance with many embodiments records a game session such that the game session can be subsequently analyzed to determine if there is any unauthorized operation of the hybrid game (such as a cheat). In a game session recording sub-function, the RSSA module includes a system to trap all user interface actions by the player (button presses, keystrokes, joystick, etc.) along with entertainment game status data supplied by the ESE into a session recording file stored in the data collection storage. This data can then be used by the playback mode at a future time. Although specific examples of the game session recording sub-function is discussed above, the game session recording sub-function can be performed using any of a variety of processes as appropriate to the requirements of a specific application in accordance with various embodiments.

Processing Apparatus

Figure 5:
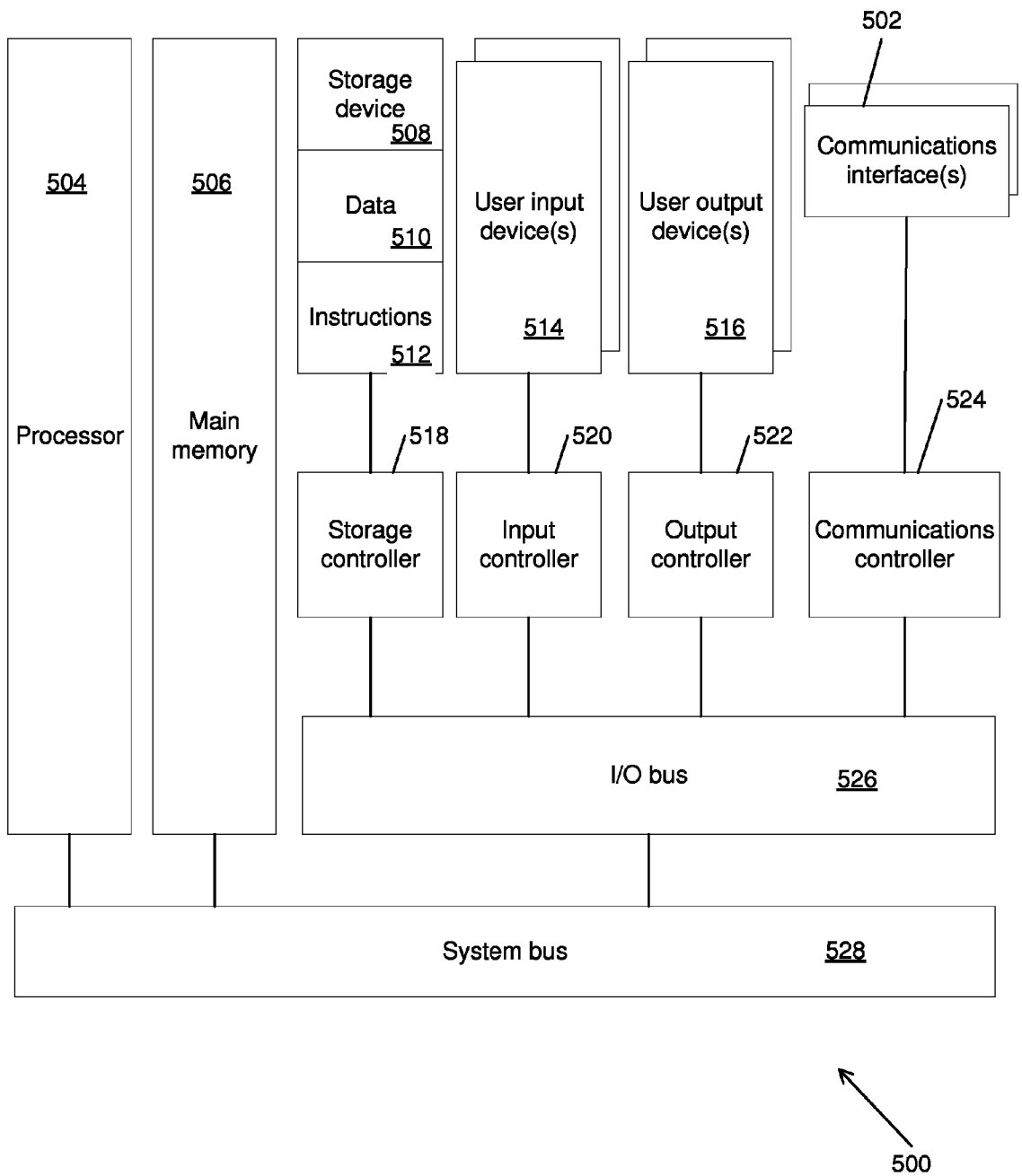
FIG. 5 illustrates a hardware architecture diagram of a processing apparatus in accordance with an embodiment of the invention.

Any of a variety of processing apparatuses can host various components of a regulated hybrid gaming system in accordance with embodiments of the invention. In several embodiments, these processing apparatuses can include, but are not limited to, a gaming machine, a general purpose computer, a computing device and/or a controller. A processing apparatus in accordance with various embodiments of the invention is illustrated in FIG. 5. In the processing apparatus 500, a processor 504 is coupled to a memory 506 by a bus 528. The processor 504 is also coupled to non-transitory processor-readable storage media, such as a storage device 508 that stores processor-executable instructions 512 and data 510 through the system bus 528 to an I/O bus 526 through a storage controller 518. The processor 504 is also coupled to one or more interfaces that may be used to connect the processor to other processing apparatuses as well as networks as described herein. The processor 504 is also coupled via the bus to user input devices 514, such as tactile devices like keyboards, keypads, foot pads, touch screens, trackballs, etc., as well as non-contact devices such as audio input devices, motion sensors and motion capture devices, etc. that the processing apparatus may use to receive inputs from a user when the user interacts with the processing apparatus. The processor 504 is connected to these user input devices 514 through the system bus 528, to the I/O bus 526 and through the input controller 520. The processor 504 is also coupled via the bus to user output devices 516 such as (but not limited to) visual output devices, audio output devices, and/or tactile output devices that the processing apparatus uses to generate outputs perceivable by the user when the user interacts with the processing apparatus. In several embodiments, the processor is coupled to visual output devices such as (but not limited to) display screens, light panels, and/or lighted displays. In a number of embodiments, the processor is coupled to audio output devices such as (but not limited to) speakers, and/or sound amplifiers. In many embodiments, the processor is coupled to tactile output devices like vibrators, and/or manipulators. The processor is connected to output devices from the system bus 528 to the I/O bus 526 and through the output controller 522. The processor 504 can also be connected to a communications interface 502 from the system bus 528 to the I/O bus 526 through a communications controller 524.

In various embodiments, a processor loads the instructions and the data from the storage device into the memory and executes the instructions and operates on the data to implement the various aspects and features of the components of a gaming system as described herein. The processor uses the user input devices and the user output devices in accordance with the instructions and the data in order to create and operate user interfaces for players, casino operators, owners, etc. as described herein.

Although the processing apparatus is described herein as being constructed from a processor and instructions stored and executed by hardware components, the processing apparatus can be composed of only hardware components in accordance with many embodiments. In addition, although the storage device is described as being coupled to the processor through a bus, those skilled in the art of processing apparatuses will understand that the storage device can include removable media such as a USB memory device, an optical CD ROM, magnetic media such as tape or disks, etc. Also, the storage device can be accessed through one of the interfaces or over a network. Furthermore, any of the user input devices or user output devices can be coupled to the processor via one of the interfaces or over a network. In addition, although a single processor is described, those skilled in the art will understand that the processor can be a controller or other computing device or a separate computer as well as be composed of multiple processors or computing devices.

In numerous embodiments, any of an RSSA module, RSSA system, an RWE, a GWE and an ESE as described herein can be implemented on one or more processing apparatuses, whether dedicated, shared or distributed in any combination thereof, or may be implemented on a single processing apparatus. In addition, while certain aspects and features of a gaming and regulatory monitoring system described herein have been attributed to an RSSA module, RSSA system, an RWE, a GWE or an ESE, these aspects and features may be implemented in a hybrid form where any of the features or aspects may be performed by any of an RSSA module, RSSA system, an RWE, a GWE or an ESE within a gaming system without deviating from the spirit of the invention.

While the above description contains many specific embodiments of the invention, these should not be construed as limitations on the scope of the invention, but rather as an example of one embodiment thereof. It is therefore to be understood that the invention may be practiced otherwise than as specifically described, without departing from the scope and spirit of the invention. Thus, embodiments of the invention should be considered in all respects as illustrative and not restrictive.

What is claimed is:

1. A method of detecting unauthorized operation of a hybrid game, comprising:

collecting by a regulatory scanning and screening audit (RSSA) module via a network, first game operating performance data (GOPD) from a plurality of hybrid games while the plurality of hybrid games are being played by a plurality of players, the first GOPD comprising first game world credit information for first game world credit accrued by the plurality of players as a function of the plurality of players' demonstrated skill at a plurality of entertainment games of the plurality of hybrid games, and first real credit information for first real credit committed by the plurality of players to a plurality of gambling games of the plurality of hybrid games as triggered by the plurality of players skillful play of the plurality of entertainment games to accrue the first game world credit;

generating by the RSSA module a reference profile using the first GOPD, the reference profile including determining a first rate of accrual of the first game world credit by the plurality of players and a first rate of commitment of the first real credit by the plurality of players;

generating by the RSSA module a reference profile using the first GOPD, the reference profile a statistical model of entertainment game play outcomes;

collecting by the RSSA module via the network, second GOPD from the hybrid game while the hybrid game is being played by a second player, the second GOPD comprising second game world credit information for second game world credit accrued by the second player during play of an entertainment game of the hybrid game as a function of the second player's demonstrated skill at the entertainment game of the hybrid game, and second real credit information for second real credit committed by the second player to a gambling game of the hybrid game as triggered by the second player's play of the entertainment game of the hybrid game to accrue the second game world credit;

determining by the RSSA module a second rate of accrual of the second game world credit by the second player and a second rate of commitment of the second real credit by the second player;

determining by the RSSA module whether the second player is operating the hybrid game in an unauthorized manner by comparing the reference profile to the rate of accrual of the second game world credit by the second player and the rate of commitment of the second real credit by the second player; and generating by the RSSA module a notification to an operator of the hybrid game upon determination that the second player is operating the hybrid game in an unauthorized manner, based on the comparison of the second entertainment game play outcomes to the statistical model of entertainment game play.

2. The method of detecting unauthorized operation of a hybrid gaming system of claim 1, wherein the second GOPD includes user interface key sequences, and wherein determining whether the second player is operating the hybrid game in an unauthorized manner includes determining if a unique combination of user interface key sequences are present in the second GOPD that are known to enable unauthorized operation of the entertainment game.

3. The method of detecting unauthorized operation of a hybrid gaming system of claim 1, wherein the second GOPD includes game object information describing game objects used in the entertainment portion of the hybrid game; and
wherein determining whether the second player is operating the hybrid game in an unauthorized manner includes determining if known cheat objects have appeared in the entertainment game by using the game object information.

4. The method of detecting unauthorized operation of a hybrid gaming system of claim 1, wherein the first GOPD includes first entertainment game play performance and the second GOPD includes second entertainment game play performance; and
wherein determining whether the second player is operating the hybrid game in an unauthorized manner includes if the second game play performance is superior to the first game play performance.

5. The method of detecting unauthorized operation of a hybrid gaming system of claim 4, wherein the first entertainment game play performance and second entertainment game play performance includes rate of scoring information, and
wherein determining whether the second player is operating the hybrid game in an unauthorized manner includes comparing the first entertainment game play performance and the second entertainment game play performance to determine when the second player's rate of scoring is not supported by authorized hybrid game operation.

6. The method of detecting unauthorized operation of a hybrid gaming system of claim 1, wherein:
the first GOPD and second GOPD includes entertainment game progression information; and
wherein determining whether the second player is operating the hybrid game in an unauthorized manner includes detection of a change in entertainment game progression.

7. An apparatus for detecting unauthorized operation of a hybrid game, the apparatus comprising:
one or more processors; and
memory storing processor-executable instructions coupled to the one or more processors, the processor-executable instructions when executed by the one or more processors cause the one or more processors to preform a process comprising:
collecting via a network, first game operating performance data (GOPD) from a plurality of hybrid games while the plurality of hybrid games are being played by a plurality of players, the first GOPD comprising first game world credit information for first game world credit accrued by the plurality of players as a function of the plurality of players' demonstrated skill at a plurality of entertainment games of the plurality of hybrid games, and first real credit information for first real credit committed by the plurality of players to a plurality of gambling games of the plurality of hybrid games as triggered by the plurality of players skillful play of the plurality of entertainment games to accrue the first game world credit;
generating a reference profile using the first GOPD, the reference profile including determining a first rate of accrual of the first game world credit by the plurality of players and a first rate of commitment of the first real credit by the plurality of players;
generating by the RSSA module a reference profile using the first GOPD, the reference profile a statistical model of entertainment game play outcomes;
collecting via the network, second GOPD from the hybrid game while the hybrid game is being played by a second player, the second GOPD comprising second game world credit information for second game world credit accrued by the second player during play of an entertainment game of the hybrid game as a function of the second player's demonstrated skill at the entertainment game of the hybrid game, and second real credit information for second real credit committed by the second player to a gambling game of the hybrid game as triggered by the second player's play of the entertainment game of the hybrid game to accrue the second game world credit;
determining a second rate of accrual of the second game world credit by the second player and a second rate of commitment of the second real credit by the second player;
determining by the RSSA module whether the second player is operating the hybrid game in an unauthorized manner by comparing the reference profile to the rate of accrual of the second game world credit by the second player and the rate of commitment of the second real credit by the second player; and
generating by the RSSA module a notification to an operator of the hybrid game upon determination that the second player is operating the hybrid game in an unauthorized manner, based on the comparison of the second entertainment game play outcomes to the statistical model of entertainment game play.

8. The apparatus for detecting unauthorized operation of a hybrid game of claim 7, wherein the second GOPD comprises user interface key sequences, and wherein the instructions for determining whether the second player is operating the hybrid game in an unauthorized manner include determining if a unique combination of user interface key sequences are present in the second GOPD that are known to enable unauthorized operation of the entertainment game.

9. The apparatus for detecting unauthorized operation of a hybrid game of claim 7, wherein the second GOPD comprises game object information of game objects used in the entertainment game, and
wherein the instructions for determining whether the second player is operating the hybrid game in an unauthorized manner include determining if known cheat objects have appeared in the entertainment game on the basis of the first GOPD and the second GOPD.

10. The apparatus for detecting unauthorized operation of a hybrid game of claim 7, wherein:
the first GOPD and second GOPD comprise entertainment game play performance; and
wherein the instructions for determining whether the second player is operating the hybrid game in an unauthorized manner include determining if the second player is engaging in unauthorized operation of a hybrid game based upon if the second player's game play performance is superior to the game play performance reference profile.

11. The apparatus for detecting unauthorized operation of a hybrid game of claim 10, wherein: the entertainment game play performance comprises rate of scoring information; and wherein the instructions for determining whether the second player is operating the hybrid game in an unauthorized manner include determining if the second player's rate of scoring is not supported by authorized hybrid game operation.

12. A non-transitory machine-readable medium storing processor-executable instructions, the processor-executable instructions when executed by one or more processors cause the one or more processors to perform a process comprising:

collecting via a network, first game operating performance data (GOPD) from a plurality of hybrid games while the plurality of hybrid games are being played by a plurality of players, the first GOPD comprising first game world credit information for first game world credit accrued by the plurality of players as a function of the plurality of players' demonstrated skill at a plurality of entertainment games of the plurality of hybrid games, and first real credit information for first real credit committed by the plurality of players to a plurality of gambling games of the plurality of hybrid games as triggered by the plurality of players skillful play of the plurality of entertainment games to accrue the first game world credit;

generating a reference profile using the first GOPD, the reference profile including determining a first rate of accrual of the first game world credit by the plurality of players and a first rate of commitment of the first real credit by the plurality of players;

generating by the RSSA module a reference profile using the first GOPD, the reference profile a statistical model of entertainment game play outcomes;

collecting via the network, second GOPD from the hybrid game while the hybrid game is being played by a second player, the second GOPD comprising second game world credit information for second game world credit accrued by the second player during play of an entertainment game of the hybrid game as a function of the second player's demonstrated skill at the entertainment game of the hybrid game, and second real credit information for second real credit committed by the second player to a gambling game of the hybrid game as triggered by the second player's play of the entertainment game of the hybrid game to accrue the second game world credit;

determining a second rate of accrual of the second game world credit by the second player and a second rate of commitment of the second real credit by the second player;

determining by the RSSA module whether the second player is operating the hybrid game in an unauthorized manner by comparing the reference profile to the rate of accrual of the second game world credit by the second player and the rate of commitment of the second real credit by the second player; and generating by the RSSA module a notification to an operator of the hybrid game upon determination that the second player is operating the hybrid game in an unauthorized manner, based on the comparison of the second entertainment game play outcomes to the statistical model of entertainment game play.

13. The non-transitory machine-readable medium of claim 12, wherein the second GOPD comprises user interface key sequences, and wherein the instructions for determining whether the second player is operating the hybrid game in an unauthorized manner include determining if a unique combination of user interface key sequences are present in the second GOPD that are known to enable unauthorized operation of the entertainment game.

14. The non-transitory machine-readable medium of claim 12, wherein the second GOPD comprises game object information of game objects used in the entertainment game, and wherein the instructions for determining whether the second player is operating the hybrid game in an unauthorized manner include determining if known cheat objects have appeared in the entertainment game on the basis of the first GOPD and the second GOPD.

15. The non-transitory machine-readable medium of claim 12, wherein:

the first GOPD and second GOPD comprise entertainment game play performance; and wherein the instructions for determining whether the second player is operating the hybrid game in an unauthorized manner include determining if the second player is engaging in unauthorized operation of a hybrid game based upon if the second player's game play performance is superior to the game play performance reference profile.

16. The non-transitory machine-readable medium of claim 15, wherein: the entertainment game play performance comprises rate of scoring information; and wherein the instructions for determining whether the second player is operating the hybrid game in an unauthorized manner include determining if the second player's rate of scoring is not supported by authorized hybrid game operation.

17. The non-transitory machine-readable medium of claim 12, wherein:

the first GOPD and second GOPD comprise entertainment game progression information; and wherein the instructions for determining whether the second player is operating the hybrid game in an unauthorized manner include detecting a change in entertainment game progression.

* * * * *

UNITED STATES PATENT AND TRADEMARK OFFICE
CERTIFICATE OF CORRECTION

| | | |
|---|---|---|
| PATENT NO. | : 8,986,117 B2 | Page 1 of 1 |
| APPLICATION NO. | : 14/474023 | |
| DATED | : March 24, 2015 | |
| INVENTOR(S) | : Arnone et al. | |

It is certified that error appears in the above-identified patent and that said Letters Patent is hereby corrected as shown below:

IN THE CLAIMS

Column 21, Line 53, currently reads: sors cause the one or more processors to preform a Replace with: sors cause the one or more processors to perform a Signed and Sealed this
Twenty-ninth Day of September, 2015

Michelle K. Lee
*Director of the United States Patent and Trademark Office*